(12) United States Patent
Poovappa et al.

(10) Patent No.: US 11,395,216 B2
(45) Date of Patent: Jul. 19, 2022

(54) VOICE-OVER-INTERNET-PROTOCOL (VOIP) COMMUNICATIONS

(71) Applicant: Comcast Cable Communications, LLC., Philadelphia, PA (US)

(72) Inventors: Vinayaka Poovappa, King of Prussia, PA (US); Clifton Lowery, Philadelphia, PA (US); John B. Hart, Philadelphia, PA (US); Franklyn Athias, Cherry Hill, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 138 days.

(21) Appl. No.: 16/176,683

(22) Filed: Oct. 31, 2018

(65) Prior Publication Data

US 2020/0137679 A1 Apr. 30, 2020

(51) Int. Cl.
| | |
|---|---|
| *H04W 36/00* | (2009.01) |
| *H04W 76/00* | (2018.01) |
| *H04W 24/08* | (2009.01) |
| *H04W 40/00* | (2009.01) |
| H04L 29/06 | (2006.01) |
| *H04W 48/18* | (2009.01) |
| *H04M 7/00* | (2006.01) |
| *H04W 76/10* | (2018.01) |
| H04W 84/12 | (2009.01) |

(52) U.S. Cl.
CPC ......... *H04W 48/18* (2013.01); *H04M 7/006* (2013.01); *H04W 76/10* (2018.02); *H04W 84/12* (2013.01)

(58) Field of Classification Search
CPC ...... H04M 7/128; H04M 7/006; H04M 7/123; H04M 11/04; H04M 7/1235; H04W 48/18; H04W 36/0066; H04W 4/22; H04W 4/90; H04W 36/0022; H04W 36/14; H04W 76/10; H04W 40/24; H04W 76/007; H04W 84/12; H04W 76/50; H04W 88/06; H04W 40/36; H04W 24/08; H04L 29/06; H04L 65/1069; H04L 65/10; H04L 65/105; H04L 65/1016; H04L 61/1511; H04L 65/1073; H04L 45/302; H04L 45/306; H04L 65/1006
USPC .......................................................... 370/328
See application file for complete search history.

(56) References Cited

U.S. PATENT DOCUMENTS

| | | | | |
|---|---|---|---|---|
| 8,078,164 | B2* | 12/2011 | Ganesan | H04W 36/18 455/432.1 |
| 10,652,796 | B2* | 5/2020 | Laliberte | H04L 65/10 |
| 2012/0250622 | A1* | 10/2012 | Gomez Diaz | H04L 65/1006 370/328 |
| 2013/0288644 | A1* | 10/2013 | Schroeder | H04W 12/06 455/411 |
| 2014/0148129 | A1* | 5/2014 | Lundstrom | H04W 8/26 455/411 |
| 2015/0078332 | A1* | 3/2015 | Sidhu | H04M 7/1235 370/331 |
| 2016/0014591 | A1* | 1/2016 | Sekaran | H04M 7/0075 455/432.1 |
| 2016/0112941 | A1* | 4/2016 | Desai | H04M 7/006 370/329 |

(Continued)

*Primary Examiner* — Edan Orgad
*Assistant Examiner* — Vanneilian Lalchinthang
(74) *Attorney, Agent, or Firm* — BakerHostetler

(57) ABSTRACT

Systems and methods are disclosed that enable an operator of a packet switched network to provide mobile telephone services in cooperation with an operator of a cellular network.

18 Claims, 10 Drawing Sheets

(56) References Cited

U.S. PATENT DOCUMENTS

| | | | | |
|---|---|---|---|---|
| 2017/0034744 A1* | 2/2017 | Kwok | ............... | H04W 72/085 |
| 2017/0325141 A1* | 11/2017 | Laliberte | ............... | H04W 12/06 |
| 2017/0366955 A1* | 12/2017 | Edge | ............... | H04M 11/04 |
| 2018/0007587 A1* | 1/2018 | Feldman | ............... | H04W 36/18 |
| 2018/0124124 A1* | 5/2018 | Corona | ............... | H04L 65/105 |
| 2018/0263012 A1* | 9/2018 | Ryu | ............... | H04W 68/02 |
| 2018/0359811 A1* | 12/2018 | Verzun | ............... | H04L 12/28 |
| 2019/0037071 A1* | 1/2019 | Singh | ............... | H04L 63/0876 |
| 2019/0253836 A1* | 8/2019 | Sinha | ............... | H04W 4/023 |

* cited by examiner

VOICE-OVER-INTERNET-PROTOCOL (VOIP) COMMUNICATIONS

BACKGROUND

Voice Over Internet Protocol (VoIP) or Internet Protocol (IP) Telephony is a technology that allows a user to make a telephone call over the Internet or a dedicated network in IP packets, instead of over dedicated voice transmission lines. The steps and principles involved in originating VoIP telephone calls are similar to traditional digital telephony and involve signaling, channel setup, digitization of the analog voice signals, and encoding. Instead of being transmitted over a circuit-switched network, however, the digital information is packetized, and transmission occurs as IP packets over a packet switched network. In addition to phone devices specially designed for VoIP communications, VoIP client software is also available on many mobile phones, personal computers, and other Internet access devices.

SUMMARY

Described herein are systems and methods that enable an operator of a packet switched network to provide mobile telephone services in cooperation with an operator of a cellular network. The cellular network may comprise a base station configured to provide access to the cellular network, and the packet switched network may comprise a wireless access point configured to provide access to the packet switched network. If a mobile device of the system is unable to connect to the packet switched network using the wireless access point, the mobile device may establish a wireless connection to and authenticate with the cellular network using the base station of the cellular network. The authenticated mobile device may establish, via the cellular network, a cellular data connection to the packet-based network. With this cellular data connection to the packet-based network, the mobile device may establish a connection to the packet switched network using credentials associated with the packet switched network and may register with the packet switched network for telephony service. If the wireless access point of the packet switched network remains or becomes unavailable, the mobile device may employ its cellular data connection to the packet switched network to perform VoIP communications. An additional cellular network may be employed to provide telephony services if the first cellular network and the packet switched network are not accessible from the mobile device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The following detailed description is better understood when read in conjunction with the appended drawings; however, the subject matter is not limited to specific elements and instrumentalities shown. In the drawings.

DETAILED DESCRIPTION

Figure 1:
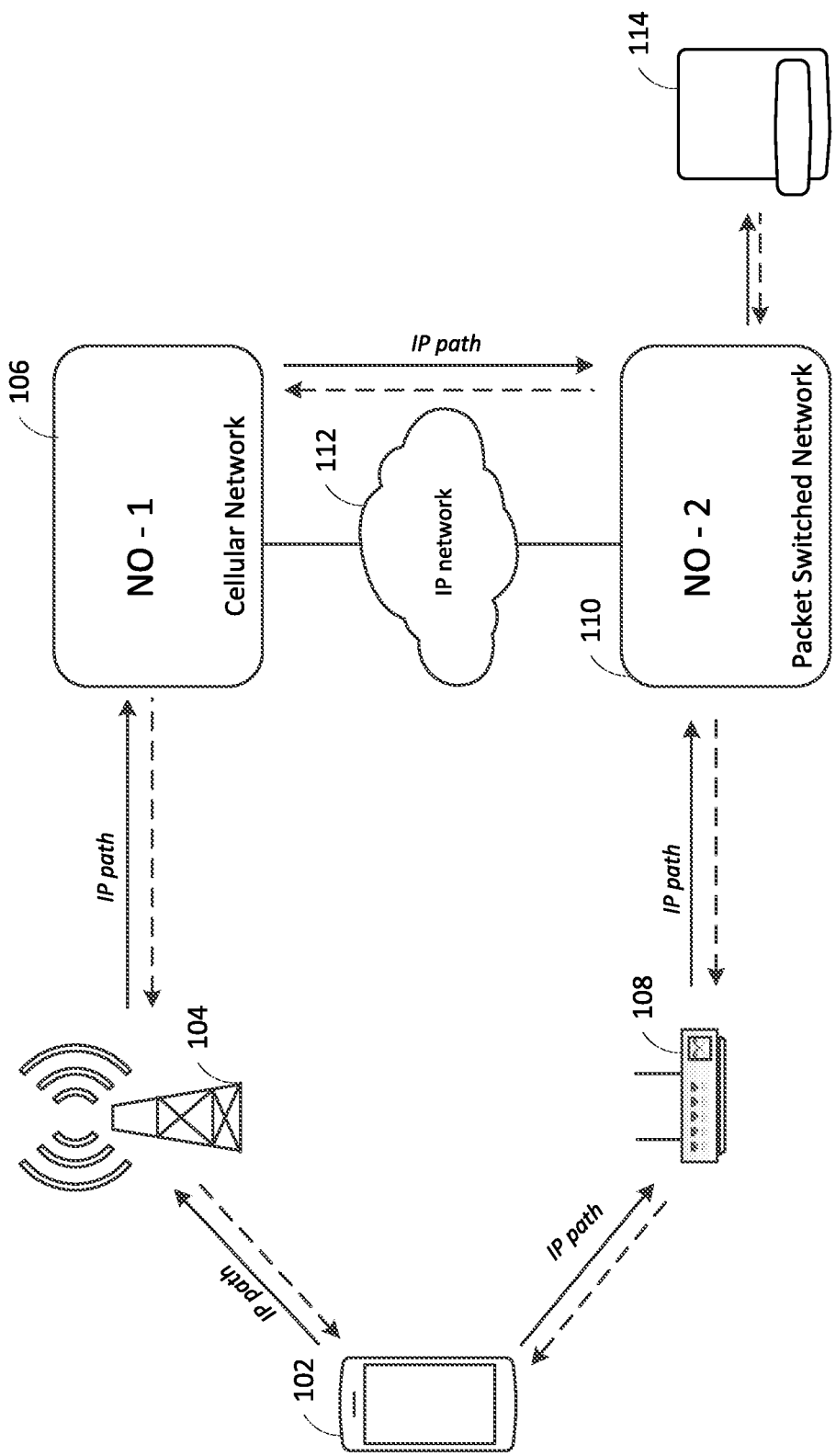
FIG. 1 is a block diagram illustrating a system for providing mobile telephone service to subscribers of an operator of a packet switched network.

With a VoIP client on a mobile phone, it is possible for users to move within range of virtually any IP network and have the ability to make and receive calls at their mobile phone number, which is commonly referred to as a personal telephone number (TN). This is, in fact, one of the benefits of VoIP service, whereby a user can take their VoIP-capable mobile phone with them to a hotel with broadband Internet service and have their home phone ring in their hotel room. By contrast, traditional telephone service is tied to a specific location by nature of the circuit-based telephone network.

With the prevalence of Wi-Fi connectivity on personal computers, mobile phones, and other hand-held devices, VoIP communications are often conducted over a Wi-Fi connection to the Internet. VoIP communication via a Wi-Fi access point is commonly referred to as Wi-Fi calling.

Mobile telephone service may be provided by a mobile network operator (MNO). A user may purchase a mobile device, such as a mobile phone, and have that phone activated for service with the MNO—usually by purchasing a service plan with the MNO. Typically, an MNO will operate a nation-wide circuit-switched network implemented in accordance with the Third Generation Partnership Project (3GPP) Evolved Packet Core network specifications and standards.

A user may purchase a mobile device, such as a mobile phone, and establish service with a selected MNO. The mobile device may be provisioned by the MNO with one or more credentials that enable the mobile device to connect to and authenticate with the MNO's network in order to use the communications services of the MNO network. One of these credentials may comprise an identifier, such as, for example, a telephone number (TN) provisioned by the MNO. The telephone number may comprise a mobile station international subscriber directory number (MSISDN).

It is also common for other network operators, such as cable network operators, to offer conventional telephone service using VoIP technology across that network operator's packet switched (e.g., Internet Protocol (IP)) network. IP networks supporting VoIP capabilities may be implemented in accordance with the 3GPP IP-Multimedia Subsystem architecture specified in 3GPP TS 22.228, TS 23.228, and related specifications.

As with mobile phone service purchased from an MNO, a user or subscriber of a packet switched network operator may purchase telephone service from the packet switched network operator. The user may be assigned an identifier, such as a telephone number (TN), by the network operator for use in connection with the VoIP service on the network operator's packet switched network. In some cases, the user may request that the user's previously obtained land-line telephone number be ported to the network operator's system rather than a new telephone number being assigned.

It may be desirable for an operator of a packet switched network to partner with a mobile network operator in order for the packet switched network operator to offer mobile telephone service to its subscribers. However, one obstacle to such a partnership is that mobile phones configured to operate on an MNO network typically are assigned a telephone number by the MNO, whereas the packet switched network operator may prefer for such mobile phone users to be able to use a telephone number assigned by the packet switched network operator. Disclosed herein are systems and methods for overcoming this obstacle.

FIG. 1 shows a system for providing mobile telephone service to subscribers of an operator of a packet switched network 110. The packet switched network 110 may comprise a network implemented in accordance with the 3GPP IP-Multimedia Subsystem architecture specified in 3GPP TS 22.228, TS 23.228, and related specifications. As illustrated, the architecture leverages a circuit-switched network 106, such as a cellular network, operated by a mobile network operator. The cellular network 106 may be implemented in accordance with the Third Generation Partnership Project (3GPP) Evolved Packet Core (EPC) network specifications and standards. The cellular network 106 and the packet switched network 110 may both be connected to an intermediate network 112 that enables communications between them. The intermediate network 112 may comprise an Internet Protocol (IP) network. For example, the intermediate network 112 may comprise the Internet.

In the architecture of FIG. 1, a mobile device 102 may be configured to access the cellular network via a base station 104. The mobile device 102 may comprise any of a variety of different types of mobile devices, including for example, a smartphone, a tablet computer, a laptop computer, a notebook computer, a personal computer, a personal digital assistant (PDA), a user equipment (UE), a mobile station, a fixed or mobile subscriber unit, a pager, a wireless sensor, other consumer electronics, and the like.

The base station 104 may comprise a base transceiver station (BTS), a Node-B, an eNode-B, or any other network device configured to provide a wireless interface to the cellular network 106. The base station 114a may be part of a radio access network (not shown) that may include other base stations and network elements (not shown). The base station 104 may be configured to transmit and receive wireless signals on one or more carrier frequencies. The base station 104 may also be referred to as a cell of the cellular network 106. The base station 104 may provide wireless communications over a particular geographic area, which may be referred to herein as a coverage area. The coverage area may be fixed or it may change over time. Although just one mobile device 102 is illustrated in FIG. 1, any number of mobile devices may access the cellular network 106 at a given time.

The mobile device 102 and base station 104 may communicate over an air interface using any of a variety of suitable wireless communication technologies including, for example, radio frequency (RF), microwave, centimeter wave, infrared (IR), visible light, or the like. The mobile device 102 and base station 104 may implement any of a variety of cellular-based radio access technologies, such as, for example, Code Division Multiple Access (CDMA), High-Speed Packet Access (HSPA), Long Term Evolution (LTE), LTE-Advanced (LTE-A), LTE-Advanced Pro (LTE-A Pro), New Radio (e.g., 5G), or the like.

The mobile device 102 may also be configured to access the packet switched network 110 via a wireless access point 108. The wireless access point 108 may be disposed in an area, such as a geographic area, to provide wireless devices, such as mobile device 102, with wireless access to the packet switched network 110. The wireless access point 108 may utilize any suitable radio access technology for facilitating wireless connectivity with the packet switched network 110 in a limited area, such as a place of business, a home, a vehicle, a campus, or other area. The wireless access point 108 may implement the IEEE 802.11 ("Wi-Fi") radio access technology. Other radio access technologies may also, or alternatively, be employed, such as IEEE 802.16 or 802.20 ("WiMAX"), IEEE 802.15.4a ("Zigbee"), or 802.15.3c ("UWB"). The wireless access point 108 may be one of a plurality of wireless access points that provide wireless access to the packet switched network 110 over a wide geographic area.

The mobile device 102 may store a first set of credentials associated with the mobile network operator of the cellular network 106. The first set of credentials may comprise one or more identifiers associated with the mobile device, such as an International Mobile Subscriber Identifier (IMSI), and cryptographic keys needed for authentication and access to the cellular network 106 via the base station 104. The IMSI and cryptographic keys also may be referred to as Subscriber Identity Module (SIM) credentials for the mobile device 102. The first set of credentials may also comprise a unique telephone number (TN) for the mobile device assigned by the mobile network operator of the cellular network 106 for use in connection with the cellular network 106. The telephone number may comprise a mobile station international subscriber directory number (MSISDN).

The mobile device 102 may also store a second set of credentials associated with the network operator of the packet switched network 110. The second set of credentials may similarly comprise one or more identifiers associated with the mobile device, certificates, encryption keys, and other information or data needed for authentication and access to the packet switched network 110 via the access point 108. The second set of credentials may also comprise a unique telephone number (TN) for the mobile device assigned by the network operator of the packet switched network 110 for use in connection with the packet switched network 106. The telephone number of this second set of credentials may similarly comprise an MSISDN.

A user of the mobile device 102 may wish to initiate a call to another person or entity who operates another communications device 114. The other communications device 114 may be another mobile device, like mobile device 102, on another cellular network (not shown) to which the packet switched network 110 interfaces. Alternatively, the communications device 114 may be a fixed device, such as a land-line telephone or VOIP communications device, connected to the public switched telephone network (PSTN) (not shown) also to which the packet switched network 110 interfaces. The communications device 114 may also have a unique telephone number associated with it, assigned by the mobile network operator or telephone service provider with which the user of the communications device 114 may have subscribed for telephone service. Typically, a user of the mobile device 102 initiates a telephone call to the user of the communications device 114 by entering the telephone number associated with the communications device 114 into a telephone dialer application executing on the mobile device 102.

The user of the mobile device 102 may also wish to receive telephone calls on the mobile device 102. For example, the user of the mobile device 102 may wish to receive a call from the user of the other communications device 114.

As mentioned above, because the architecture illustrated in FIG. 1 enables the operator of the packet switched network to provide mobile telephone service to the user of the mobile device 102, it is desirable that any telephone number that may have been assigned to the mobile device by the mobile network operator of the cellular network 106 be hidden from the user of the mobile device and from any person or entity who may wish to initiate a call to the mobile device. Instead, it is desirable that the telephone number assigned to the mobile device by the operator of the packet switched network appear in connection with any telephone communications to or from the mobile device. That is, if the user of the mobile device 102 initiates a call to the user of the other communications device 114, the call should appear to that user as if coming from the telephone number assigned to the mobile device 102 by the operator of the packet switched network. Similarly, a user of the other communication device 114 who wishes to initiate a call to the user of the mobile device 102 should be able to initiate that call on the dialer application of the communication device 114 using the telephone number assigned to the mobile device 102 by the operator of the packet switched network 110.

If the mobile device 102 is in wireless communications range of the wireless access point 108, the mobile device may establish a wireless connection to wireless access point 108 using the second set of credentials discussed above, which are associated with and may be assigned to or provisioned on the mobile device by the network operator of the packet switched network 110. Using this second set of credentials, the mobile device may further establish a connection to the packet switched network 110, via the wireless access point 108, and may register with the packet switched network 110. The registered mobile device 102 may conduct VOIP communications via the wireless access point 108 and the packet switched network 110. For example, the mobile device 102 may initiate a VOIP telephone call to another communications device, such as the communications device 114. The mobile device 102 may also receive a VOIP telephone call from another communications device, such as the communications device 114.

If the mobile device 102 is not in wireless communication range of a wireless access point that provides connectivity to the packet switched network 110, such as the wireless access point 108, the mobile device 102 may be in range of a base station, such as the base station 104, which provides connectivity to the cellular network 106. Using the first set of credentials mentioned above, which are associated with and may be assigned to or provisioned on the mobile device by the mobile network operator of the cellular network 106, the mobile device may establish a wireless connection to the cellular network 106. The mobile device 102 may use the first set of credentials to perform an authentication of the mobile device 102 with the cellular network 106 and to establish connectivity with the cellular network 106. The mobile device 102 may establish a cellular data connection within the cellular network and may use that cellular date connection to establish an IP-based connection to the packet switched network 110. The connection to the packet switched network 110 may traverse the IP network 112.

Using the IP-based connection to the packet switched network 110 and the second set of credentials associated with the operator of that network, the mobile device 102 may register with the packet switched network 110. The registered mobile device 102 may conduct VOIP communications using the services of the packet switched network 110, but those VOIP communications may traverse the cellular data connection established through the cellular network. Moreover, in this architecture, the VOIP communications may appear to the communications device at the other endpoint, such as the communications device 114, as coming from the telephone number assigned by the operator of the packet switched network 110, even though those communications rely on the cellular data connection established through the cellular network 106.

Subsequently, should the mobile device 102 move into range of the wireless access point 108, or a similar wireless access point providing connection to the packet switched network 110, VOIP communications initiated or received by the mobile device 102 may resume over that direct wireless connection to the access point 108 and the packet switched network 110, without the need for any cellular data connection through the cellular network 106. Thus, the cellular data connection through the base station 104 and cellular network 106 may only be needed in the absence of connectivity to the packet switched network 110 via a wireless access point such as wireless access point 108. But regardless of the manner of connection to the packet switched network 110, the architecture of FIG. 1 enables any telephone number of the first set of credentials associated with the mobile network operator of the cellular network 106 effectively to be hidden from the user of the mobile device 102 and any other communications device to which it communicates using VOIP communications, such as the communications device 114. Rather, all VOIP calls coming from the mobile device 102 appear to any other communications device as if coming from the telephone number of the second set of credentials associated with the operator of the packet switched network 110, regardless of whether the mobile device 102 is connected to directly to the packet switched network 110 via the wireless access point 108 of connected to the packet switched network 110 using a cellular data connection established through the cellular network 106 and intermediate IP network 112.

Figure 2:
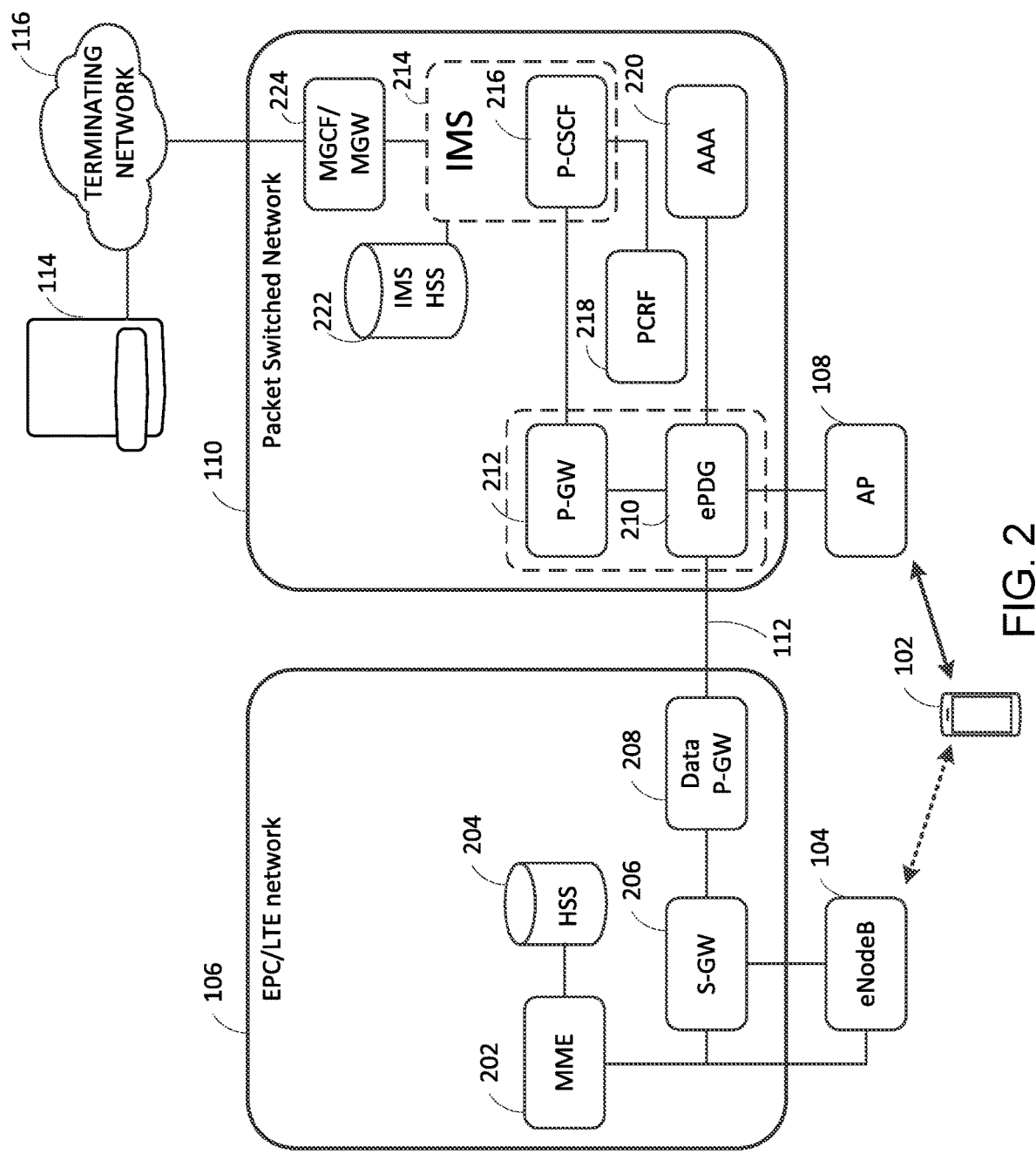
FIG. 2 is a block diagram illustrating further details of one implementation of the system of FIG. 1.

FIG. 2 is a block diagram illustrating further details of one implementation of the architecture of FIG. 1 in which the cellular network 106 implements a 3GPP Evolved Packet Core (EPC) network utilizing the Long Term Evolution (LTE) radio access technology specified by the 3GPP. The EPC 106 may be architected and operate in accordance with the 3GPP LTE specifications described in 3GPP TS 23.002 (Network Architecture), TS23.401 (General Packet Radio Service (GPRS) enhancements for Evolved Universal Terrestrial Radio Access Network (E-UTRAN) access), and TS 23.402 (Architecture enhancements for non-3GPP accesses). The base station 104 may comprise an Evolved NodeB (eNodeB) in accordance with the 3GPP LTE specification. The EPC 106 may comprise a number of network entities, including a Serving Gateway (S-GW) 206, a Packet Data Network Gateway (P-GW) 208, a Mobility Management Entity (MME) 202 and a Home Subscriber Server (HSS) 204. The EPC may be connected via the P-GW to external networks, such as the intermediate IP network 112. The intermediate IP network 112 may comprise the Internet.

The HSS 204 may comprise a database that stores information concerning mobile devices, such as mobile device 102, for which a subscription to the services of the EPC 106 has been established. The HSS 204 may also be configured to provide support functions in mobility management, call and session setup, user authentication and access authorization. The HSS 204 may store information and credentials for each mobile device for which a subscription to the service of the cellular network 106 has been established. The credentials for a mobile device, such as the mobile device 102, may comprise some or all of the first set of credentials used by the mobile device 102 to connect to and authenticate with the EPC 106. The information and credentials for a given mobile device may be stored in the form of a record in the HSS 204 database. The record for a given mobile device may comprise one or more identifiers associated with the device. The one or more identifiers may comprise an international mobile subscriber identity (IMSI), a telephone number associated with the mobile device, and other information relating to the services of the network 106 available to the mobile device. The telephone number associated with a mobile device, such as the mobile device 102, may comprise a mobile station international subscriber directory number (MSISDN), which telephone number may be assigned to the mobile device 102 by the operator of the EPC 106.

The S-GW 206 and PGW 208 handle user plane traffic. For example, those gateways may transport IP data traffic between a mobile device, such as the mobile device 102, and external networks, such as IP network 112. The S-GW 206 serves the mobile device 102 by routing incoming and outgoing IP packets. It is logically connected to the P-GW 208.

The P-GW 208 is the point of interconnect between the EPC 106 and external IP networks, such as the IP network 112. As mentioned above, the IP network 112 may comprise the Internet. These external networks may be referred to as packet data networks, and the P-GW 208 routes packets to and from those external packet data networks. The P-GW 208 may also perform various functions such as IP address/IP prefix allocation or policy control and charging. Although 3GPP specifies these gateways independently, in practice they may be combined in a single computing device or server by network vendors.

The MME 202 deals with the control plane. That is, it handles the signaling related to mobility and security for LTE access to the EPC 106. The MME is responsible for the tracking and the paging of mobile devices, such as mobile device 102, in idle-mode.

In this implementation, the packet switched network 110 may comprise a network that supports wireless communications in accordance with the IEEE 802.11 standard, often referred to as "Wi-Fi." As such, the wireless access point 108 may comprise a Wi-Fi access point (AP).

As further shown, the packet switched network 110 may further comprise an Evolved Packet Data Gateway (ePDG) 210, its own packet data network gateway (P-GW) 212, an Authentication, Authorization, and Accounting (AAA) sever 220, and an implementation of an Internet Protocol (IP) Multimedia Subsystem (IMS), sometimes also referred to as an IP Multimedia Core Network Subsystem (or "IMS Core") 214.

The ePDG 210 functions to secure the data transmission with a mobile device, such as mobile device 102, connected to the network 110 over an untrusted non-3GPP access. In this implementation, the untrusted non-3GPP access is via the Wi-Fi access point 108.

The P-GW 212 is the counterpart to the P-GW 208 in the EPC/LTE network 106. The P-GW 212 provides connectivity from the mobile device 102 (via the ePDG 210) to the IMS Core 214. The P-GW 212 may perform policy enforcement, packet filtering for different mobile devices, charging support, and other packet-related functions.

The AAA server 220 provides authentication and authorization for VoIP communications over the packet switched network 110 if initiated from a mobile device, such as mobile device 102, via the access point 108 and ePDG 210.

The IMS Core 214 is an architecture for offering multimedia and voice over IP services. The IMS Core 214 may be implemented and operate in accordance with the 3GPP specifications found in 3GPP TS 22.228 and TS 23.228.

Per the 3GPP specifications for the IMS Core 214, the IMS Core 214 further comprises a Proxy-Call Session Control Function (P-CSCF), which is the first point of contact for mobile device users of the IMS Core 214. The P-CSCF 216 functions as a proxy server for the mobile device 102; all Session Initiation Protocol (SIP) signaling traffic to and from the mobile device 102 may pass through the P-CSCF 216.

Similar to the HSS 204 which stores information relating to mobile device subscribers of the EPC/LTE network 106, an HSS 222 in the packet switched network 110 may comprise a database that stores information concerning mobile devices, such as mobile device 102, for which a subscription to the services of the packet switched network 110 has been established. The HSS 222 may also perform mobile device authentication and authorization functions. The HSS 222 may store information and credentials for each mobile device for which a subscription to the services of the packet switched network 110 has been established. The credentials for a mobile device, such as the mobile device 102, may comprise some or all of the second set of credentials discussed above that are used by the mobile device 102 to connect to and register with the IMS Core 214 of the packet switched network 110. The information and credentials for a given mobile device may be stored in the form of a record in the HSS 222 database. The record for a given mobile device may comprise one or more identifiers associated with the device. The one or more identifiers may comprise an international mobile subscriber identity (IMSI), a telephone number associated with the mobile device, and other information relating to the services of the network 110 available to the mobile device. The telephone number associated with a mobile device, such as the mobile device 102, may comprise a mobile station international subscriber directory number (MSISDN), which telephone number may be assigned to the mobile device 102 by the operator of the packet switched network 110.

Call signaling received by the IMS Core 214 that is destined for an external target communications device, such as communications device 114, may be routed through a media gateway control function (MGCF) and associated media gateway (MGW) 224 to an external terminating network 116 to which the communications device 114 is connected. That terminating network 116 may comprise the public switched telephone network (PSTN), another cellular network operated by another mobile network operator. Alternatively, the communications device 114 may belong to another subscriber of the packet switched network 110 or the EPC/LTE network 106. The MGCF/MGW may serve as in interface between the Session Initiation Protocol (SIP) signaling of the IMS Core 214 and the signaling of the terminating network 116, such as the PSTN.

As described above, if the mobile device 102 is in wireless communications range of the wireless access point 108, the mobile device may establish a wireless connection to the wireless access point 108 using its set of credentials associated with the packet switched network 110. The mobile device may further establish a connection to the packet switched network 110, via the wireless access point 108, and may register with the IMS Core 214 of the packet switched network. The registered mobile device 102 may conduct VOIP communications via the wireless access point 108 and the packet switched network 110. For example, the mobile device 102 may initiate a VOIP telephone call to another communications device, such as the communications device 114. The mobile device 102 may also receive a VOIP telephone call from another communications device, such as the communications device 114.

Figure 3:
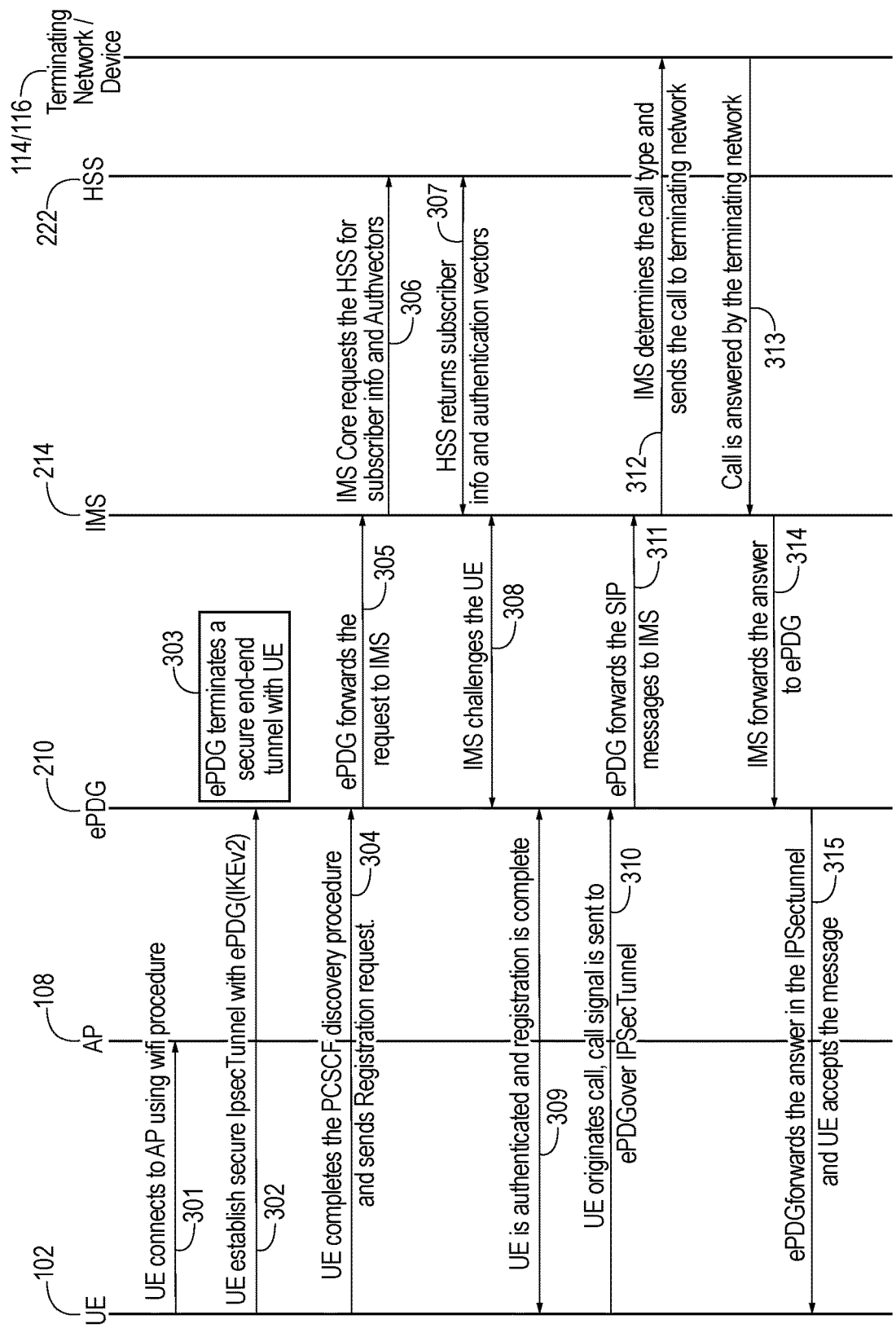
FIG. 3 is a call flow illustrating a method for conducting VoIP communications in the system illustrated in FIGS. 1 and 2.

FIG. 3 is a call flow illustrating a method for conducting VOIP communications using the wireless access point 108 and packet switched network 110. At step 301 of FIG. 3, the mobile device 102, which may also be referred to herein as a user equipment (UE), connects to the wireless access point 108. In the system of FIG. 2, in which the wireless access point 108 operates in accordance with the IEEE 802.11 (Wi-Fi) protocol, the mobile device 102 connects to the wireless access point 108 using the IEEE 802.11 protocol. In step 302, the mobile device 102 may send a message to the ePDG 210 requesting to establish an Internet Protocol security (IPsec) tunnel with the ePDG 210 using the Internet Key Exchange Protocol version 2 (IKEv2). This step 302 may be performed in accordance with the specifications of 3GPP TS 33.402 (3GPP System Architecture Evolution (SAE); Security aspects of non-3GPP accesses). In step 303, the ePDG 210 establishes the secure end-to-end tunnel (IPsec) with the mobile device 102.

In step 304, using the IPsec tunnel established with the ePDG 210, the mobile device 102 attempts to discover a Proxy-Call Session Control Function (P-CSCF), such as P-CSCF 216, which it may use to register with the IMS Core 214. The mobile device 102 may send a request to the discovered P-CSCF to register with the IMS Core 214. This discovery and registration process may be performed in accordance with the specifications of 3GPP TS 24.229 (IP multimedia call control protocol based on Session Initiation Protocol (SIP) and Session Description Protocol (SDP); Stage 3).

In step 305, the request to register with the IMS Core 214 is forwarded by the ePDG 210 to the P-CSCF 216 of the IMS Core 214. In step 306, in response to the request, the IMS Core 214 requests information and authentication credentials for the mobile device 102 from the IMS HSS 222. The HSS 222 maintains a profile for the mobile device 102 which contains these credentials. The credentials stored in the HSS profile correspond to the aforementioned credentials provisioned on the mobile device 102 by the operator of the packet switched network 110. The HSS 222 returns the requested information and credentials in step 307. The HSS 222 will also store in its profile for the mobile device 102 an identifier, such as a fully qualified domain name, of the P-CSCF with which the mobile device 102 has established communication. The mobile device 102 will continued to use that discovered P-CSCF as long as its registration with the IMS Core 214 remains valid.

In step 308, using the authentication credentials returned by the IMS HSS 222, the IMS Core 214 begins an authentication process with the mobile device 102 by sending a challenge message to the mobile device 102 via the ePDG. In step 309, the mobile device 102 and IMS Core 214 may complete the authentication and registration process. At this point, the mobile device 102 is registered with the IMS Core 214 and may conduct VoIP communications over the packet switched network 110. The IMS Core 214 may store the telephone number TN (which may comprise an MSISDN) assigned by the operator of the packet-switched network and maintains a mapping of that telephone number to the assigned IP address of the mobile device. Note that the IP address is assigned by the PGW 208 of the EPC. The foregoing steps 5 through 9 may be performed in accordance with the specifications of 3GPP TS 24.229.

At step 310, the mobile device 102 may originate a VoIP call to another communications device, such as the communications device 114. The VoIP call may be initiated by a user of the mobile device 102 by dialing the telephone number (TN) of the destination communications device 114 using a dialer application (not shown) on the mobile device 102. The mobile device 102 may initiate the signaling for the call using the Session Initiation Protocol (SIP), as specified in Internet Engineering Task Force (IETF) Request for Comments (RFC) 3261 (SIP: Session Initiation Protocol). A SIP message initiating the call may be sent to the ePDG 210 via the IPsec tunnel established between the mobile device 102 and the ePDG 210. The SIP message may comprise the telephone number (TN) of the mobile device assigned to the mobile device by the operator of the packet-switched network, as the originator of the call, and the telephone number (TN) of the destination dialed by the user. In step 311, the ePDG 210 may forward the SIP message(s) to the IMS Core 214 via the P-GW 212. In step 312, the IMS Core 214 may determine the call type and destination, such as the communications device 114, and may forward the call signaling (e.g., message) to the terminating network of the destination communications device 114 via the MGCF/MGW 224.

In step 313, the call may be answered by the communications device 114 of the terminating network 116 and a message indicating that the call has been answered may be received by the IMS Core 214. The IMS Core 214 may forward the answer message to the ePDG in step 314. In step 315, the ePDG will forward the answer message to the mobile device 102 via the established IPsec tunnel. The mobile device 102 may accept the answer message. The voice data of the VoIP call may be carried via the same IPSec tunnel established for the call signaling, which may serve as the bearer channel for the voice data.

As also mentioned above, if the mobile device 102 is not in wireless communication range of a wireless access point that provides connectivity to the packet switched network 110, such as the wireless access point 108, the mobile device 102 may be in range of a base station, such as the base station 104, which provides connectivity to the EPC/LTE network 106. Using another set of credentials on the mobile device associated with the cellular network 106, the mobile device may establish a wireless connection to the cellular network 106 via the base station (e.g., eNodeB) 104. The mobile device 102 may use the credentials associated with the EPC/LTE network 106 to perform an authentication of the mobile device 102 with the network 106 and to establish a connection to the EPC/LTE network 106. The mobile device 102 may establish a cellular data connection within the network 106 and may use that cellular data connection to establish an IP-based connection to the packet switched network 110. The connection to the packet switched network 110 may traverse the IP network 112, which may comprise the Internet. Using that IP-based connection to the packet switched network 110, the mobile device 102 may register with the IMS Core 214 of the packet switched network 110 in a manner similar to that illustrated and described above in connection with FIG. 3—except that instead of establishing an IPsec tunnel with the ePDG 210 of the packet switched network via a wireless access point, such as wireless access point, 108, the mobile device 108 instead establishes an IPsec tunnel with the ePDG 210 using its cellular data connection through the EPC/LTE network. The registered mobile device 102 may conduct VOIP communications using the services of the packet switched network 110, but between the mobile device 102 and the ePDG 210, those VOIP communications will traverse the cellular data connection established through the EPC/LTE network 106. And, any such VOIP communications may appear to any communications device at the other endpoint, such as the communications device 114, as coming from the telephone number assigned by the operator of the packet switched network 110, even though those communications rely on the cellular data connection established through the EPC/LTE network 106.

Figure 4:
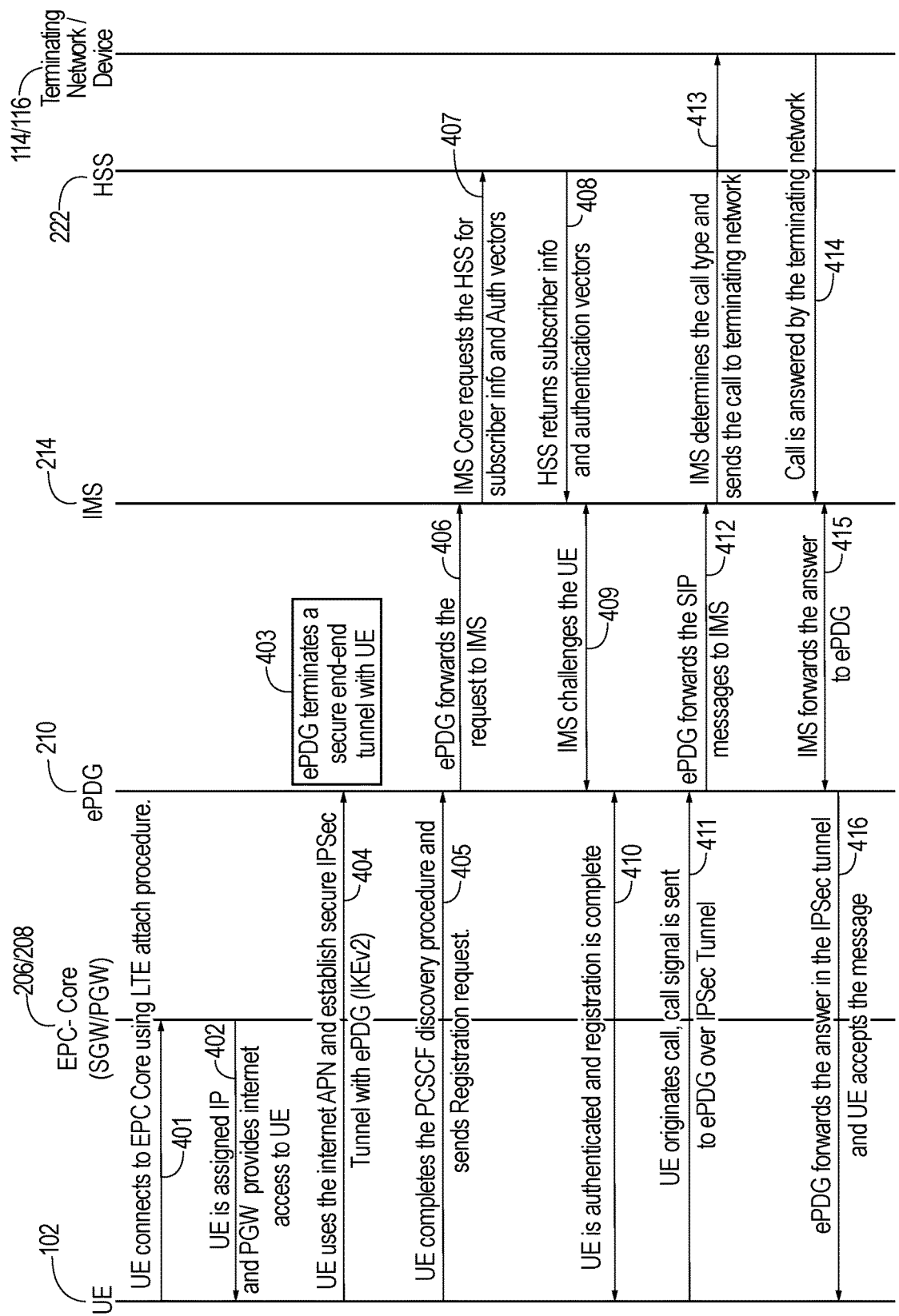
FIG. 4 is a call flow illustrating a method for conducting VoIP communications in the system illustrated in FIGS. 1 and 2.

FIG. 4 is a call flow illustrating a method of using a cellular data connection through the EPC/LTE network 106 to register with the packet switched network 110 to enable VOIP communications via the packet switched network 110. Until the mobile device 102 moves into range of a wireless access point, such as wireless access point 108, the mobile device 102 may continue to rely on the cellular data connection through the EPC/LTE network 106 to carry the data of a VoIP communication between the mobile device 102 and the ePDG 210 of the packet switched network 110.

With continuing reference to both FIGS. 2 and 4, in step 401 of FIG. 4, using a base station, such as the eNodeB 104, the mobile device 102 may connect to the SGW 206 and PGW 208 of the EPC/LTE network. The mobile device 102 may utilize the LTE attach procedure specified in 3GPP TS 23.401 to make this connection.

In step 402, the mobile device 102 is assigned an IP address and is provided by the PGW 208 with a cellular data connection to the intermediate network 112 (which may comprise the Internet).

In step 403, the mobile device 102 utilizes the cellular data connection to the intermediate network 112 to send a message to the ePDG 210 of the packet switched network 110 requesting to establish an Internet Protocol security (IPsec) tunnel with the ePDG 210 using the Internet Key Exchange Protocol version 2 (IKEv2). This step 402 may be performed in accordance with the specifications of 3GPP TS 33.402. In step 403, the ePDG 210 establishes the secure end-to-end tunnel (IPsec) with the mobile device 102. The process may continue in a manner similar to that illustrated in steps 4-15 of FIG. 2.

In step 405 of FIG. 4, using the IPsec tunnel established with the ePDG 210, the mobile device 102 attempts to discover a Proxy-Call Session Control Function (P-CSCF) of the packet switched network 110, such as P-CSCF 216, which it may use to register with the IMS Core 214 of the packet switched network. The mobile device 102 may send a request to the discovered P-CSCF to register with the IMS Core 214. This discovery and registration process may be performed in accordance with the specifications of 3GPP TS 24.229.

In step 406, the request to register with the IMS Core 214 is forwarded by the ePDG 210 to the P-CSCF 216 of the IMS Core 214. In step 407, in response to the request, the IMS Core 214 requests information and authentication credentials for the mobile device 102 from the IMS HSS 222. The HSS 222 maintains a profile for the mobile device 102 which contains these credentials. The credentials stored in the HSS profile correspond to the aforementioned credentials provisioned on the mobile device 102 by the operator of the packet switched network 110. The HSS 222 returns the requested information and credentials in step 408. The HSS 222 will also store in its profile for the mobile device 102 an identifier, such as a fully qualified domain name, of the P-CSCF with which the mobile device 102 has established communication. The mobile device 102 will continued to use that discovered P-CSCF as long as its registration with the IMS Core 214 remains valid.

In step 409, using the authentication credentials returned by the IMS HSS 222, the IMS Core 214 begins an authentication process with the mobile device 102 by sending a challenge message to the mobile device 102 via the ePDG. In step 410, the mobile device 102 and IMS Core 214 complete the authentication and registration process. At this point, the mobile device 102 is registered with the IMS Core 214 and may conduct VoIP communications over the packet switched network 110. As a further part of this registration process, the IMS Core 214 stores the telephone number TN (which may comprise an MSISDN) assigned by the operator of the packet-switched network and maintains a mapping of that telephone number to the assigned IP address of the mobile device. Note that the IP address is assigned by the PGW 208 of the EPC network 106. The foregoing steps 6 through 10 may be performed in accordance with the specifications of 3GPP TS 24.229.

At step 411, the mobile device 102 may originate a VoIP call to another communications device, such as the communications device 114. The VoIP call may be initiated by a user of the mobile device 102 by dialing the telephone number of the destination communications device 114 using a dialer application (not shown) on the mobile device 102. The mobile device 102 may initiate the signaling for the call using the Session Initiation Protocol (SIP), as specified in IETF RFC 3261. A SIP message initiating the call may be sent to the ePDG 210 via the IPsec tunnel established between the mobile device 102 and the ePDG 210. The SIP message may comprise the telephone number (TN) of the mobile device assigned to the mobile device by the operator of the packet-switched network, as the originator of the call, and the telephone number (TN) of the destination dialed by the user. In step 412, the ePDG 210 may forward the SIP message(s) to the IMS Core 214 via the P-GW 212. In step 413, the IMS Core 214 may determine the call type and destination, such as the communications device 114, and may forward the call signaling (e.g., message) to the terminating network of the destination communications device 114 via the MGCF/MGW 224.

In step 414, the call may be answered by the communications device 114 of the terminating network 116 and a message indicating that the call has been answered may be received by the IMS Core 214. The IMS Core 214 may forward the answer message to the ePDG in step 415. In step 416, the ePDG may forward the answer message to the mobile device 102 via the established IPsec tunnel created over the cellular data connection of the mobile device 102 through the EPC/LTE network 106. The mobile device 102 may accept the answer message. The voice data of the VoIP call may be carried via the same IPSec tunnel established for the call signaling over the cellular data connection through the EPC/LTE network 106, which may serve as the bearer channel for the voice data. Thus, unlike the method illustrated in FIG. 3, in the method of FIG. 4, the voice data transmitted between the mobile device 102 and the ePDG 210 of the packet switched network will be carried over the cellular data connection established for the mobile device 102 through the EPC/LTE network 106. That is, via the eNodeB 104, SGW 206, and PGW 208. However, because the telephone number (TN) of the mobile device assigned by the operator of the packet switched network is passed in the SIP messaging for the call, the call will appear as if originating from that telephone number, not any telephone number associated with the EPC/LTE network 106.

Figure 5:
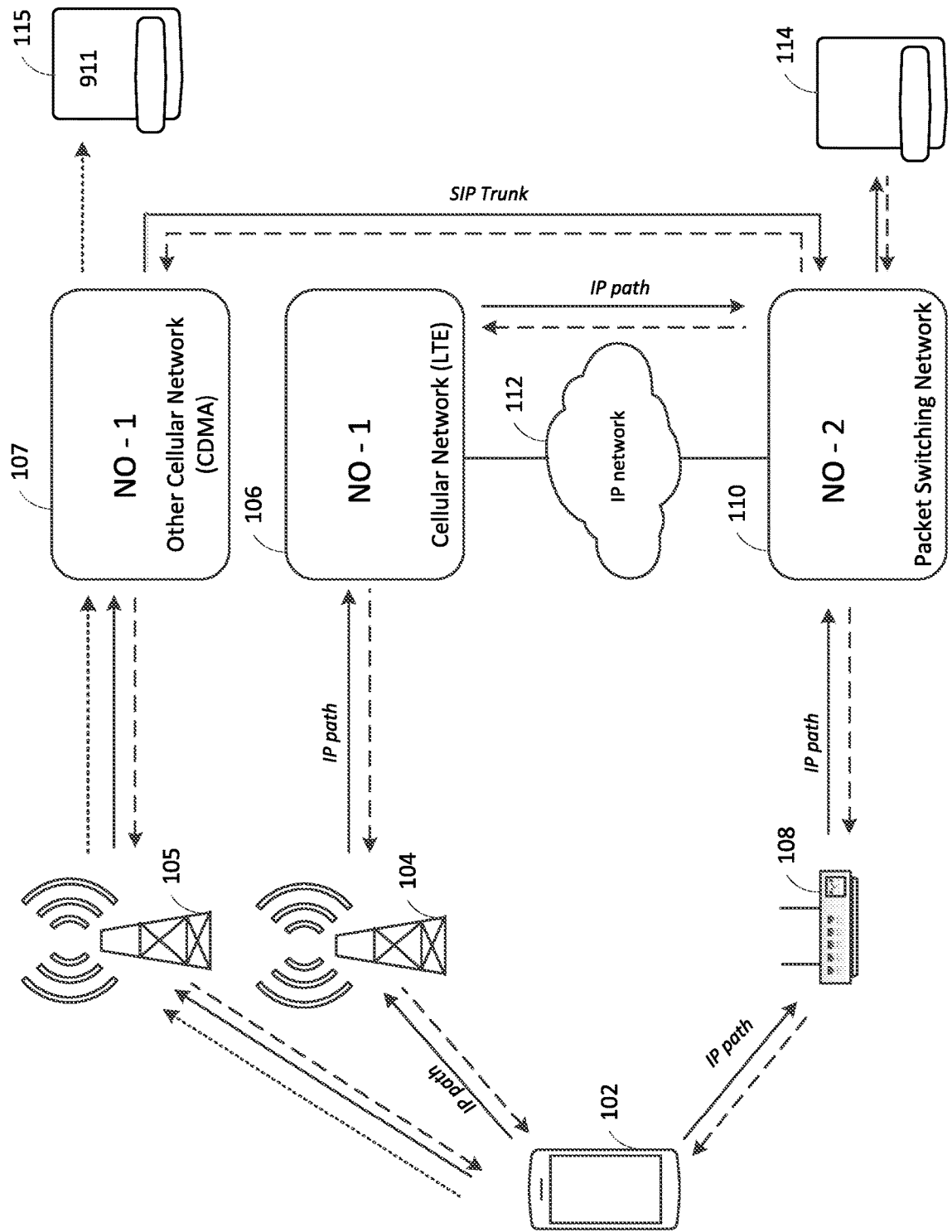
FIG. 5 is a block diagram illustrating a system for providing mobile telephone service to subscribers of an operator of a packet switched network.

FIG. 5 shows a system for providing mobile telephone service to subscribers of an operator of a packet switched network 110. In the architecture of FIG. 5, the mobile device 102, first cellular network 106, and packet switched network 110 may operate as described above in connection with the descriptions of FIGS. 1-4. However, in this architecture, an additional cellular network 107 may be accessible to the mobile device 102 via another base station 105. The mobile device 102 may be configured to access this additional cellular network 107 in the event that a wireless connection to the packet switching network 110 is not available and no cellular connection is available to the cellular network 106.

The additional cellular network may implement the Code Division Multiple Access (CDMA) radio access technology specified in the 3GPP2 CDMA2000 1×RTT Specification. The base station 105 may comprise a NodeB and associated radio network controller (RNC). The mobile network operator (MNO) of the first cellular network 106 may also be the MNO of the additional cellular network 107.

If a user of a mobile device, such as the mobile device 102, is unable to establish a connection to either the first cellular network 106 (via base station 104) or the packet switching network 110 (via wireless access point 108) and wishes to initiate a call to another communication device, such as the communications device 114, the mobile device 102 may connect instead to the additional cellular network 107 via one of its base stations, such as base station 105. This telephony request may be received by the cellular network 107. The request may comprise a first identifier associated with the mobile device, such as a telephone number, that has been assigned by the MNO of the cellular network 107. The cellular network 107 may be configured to forward the telephony request to the packet switching network 110 using a Session Initiation Protocol (SIP) trunk connecting the two networks. Alternatively, a time-division multiplexing (TDM) trunk may be employed.

The telephony request may be received by the packet switched network 110, and the packet switched network 110 may be configured to determine that the identifier of the mobile device 102 included in the telephony request—which is assigned by the MNO of the cellular network 107—maps to a second identifier that identifies the mobile device to the second network operator. This second identifier may comprise a telephone number assigned to the mobile device 102 by the operator of the packet switched network 110. After determining the mapping, the packet switched network 110 may be configured to modify the telephony request by replacing the first identifier associated with the cellular network 107 with the second identifier assigned by the packet switched network 110. The packet switched network 110 may forward the modified telephony request toward the intended destination of the telephony request, such as for example, the communications device 114.

For an inbound call from a communications device, such as the communications device 114, to a mobile device 102, the packet switched network 110 may be configured to receive a telephony request sent from the communications device 114 identifying the mobile device 102 as the destination for the call. The telephony request may identify the mobile device 102 by the telephone number assigned to the device by the operator of the packet switching network 110.

The packet switching network 110 may determine that the mobile device 102 to which the call is directed is not reachable via the packet switching network—neither via a wireless access point, such as the access point 108, nor via a cellular data connection through the first cellular network 106. Upon determining that the mobile device 102 is not reachable via the packet switched network 102, the packet switching network 110 may be further configured to determine that the telephone number in the received telephony request maps to a second telephone number assigned to the mobile device by the operator of the additional cellular network 107. The packet switching network 110 may modify the telephony request by replacing the telephone number assigned to the mobile device 102 by the packet switching network with the telephone number assigned by the cellular network 107. The packet switching network 110 may forward the telephony request to the cellular network 107 via the SIP trunk (or alternatively a TDM trunk) established between the two networks. The cellular network 107 may route the call to the mobile device via one of its base stations, such as base station 105. Thus, even in the event that the mobile device 102 does not have connectivity to either the packet switched network 110 or the first cellular network 106, the mobile device 102 may still be able to originate and receive calls via the additional cellular network 107. Moreover, those calls may still appear to the respective endpoints as if originating from or destined for the telephone number assigned to the mobile device 102 by the operator of the packet switched network.

Figure 6:
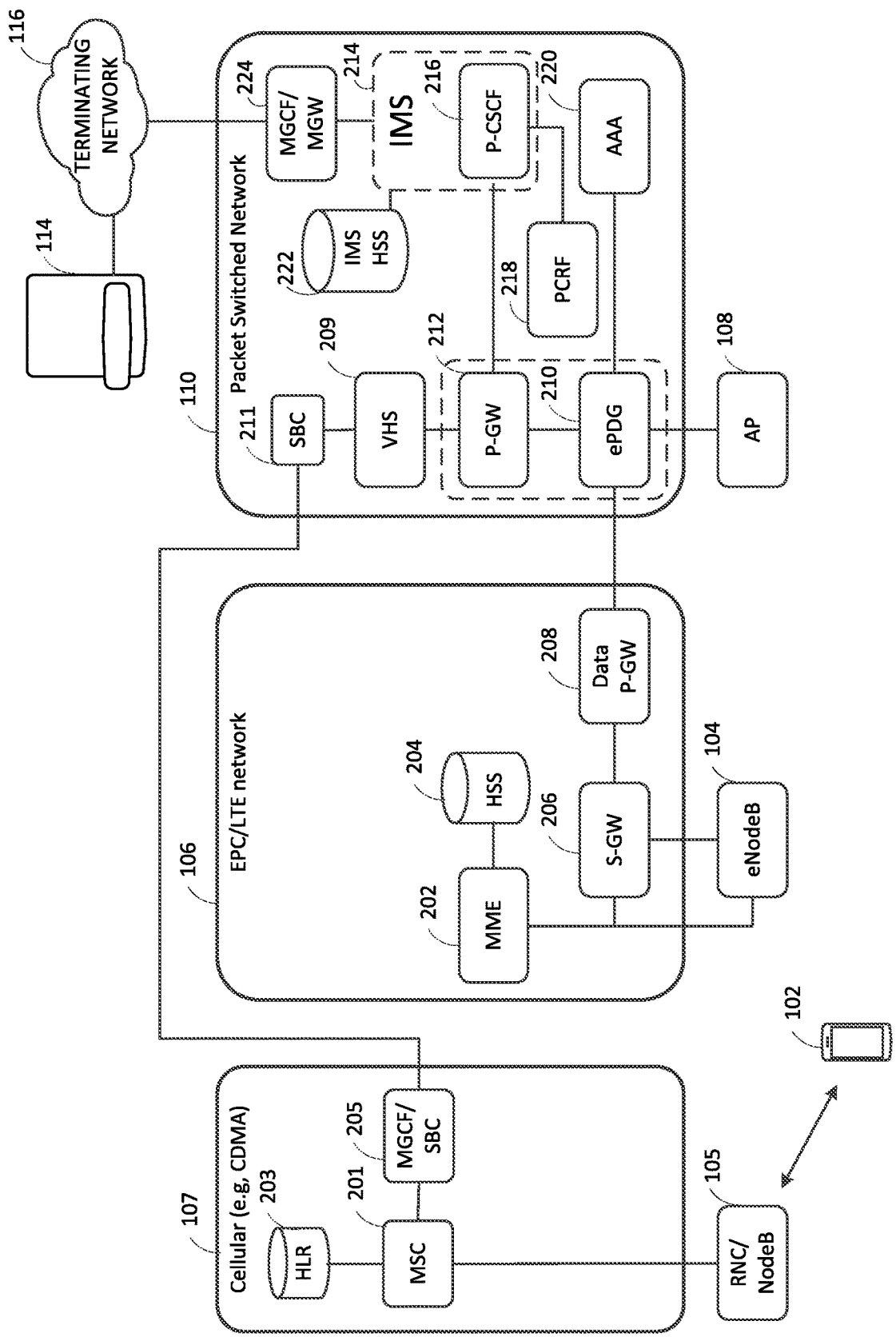
FIG. 6 is a block diagram illustrating further details of one implementation of the system of FIG. 5.

FIG. 6 is a block diagram illustrating further details of one implementation of the architecture of FIG. 5. The EPC/LTE network may comprise essentially the same architecture as in the architecture of FIG. 2.

The additional cellular network 107 may comprise a cellular network that implements the Code Division Multiple Access (CDMA) radio access technology specified in the 3GPP2 CDMA2000 1×RTT Specification. Access to the CDMA network 107 may be made via one of a plurality of base stations, such as the base station 105, which may comprise a NodeB and associated radio network controller (RNC). The CDMA network 107 may further comprise a mobile switching center server (MSC) 201 and an associated Home Location Register (HLR) 203.

In a CDMA network such as the network 107, the MSC 201 may be configured to perform call switching and mobility management functions for mobile devices, such as the mobile device 102, roaming on its network of base stations (such as, NodeB/RNC 105). It receives telephony requests from mobile devices and determines how to route the call signaling to the appropriate destination for the request. The functionality of the MSC may be implemented in accordance with the 3GPP2 CDMA2000 1×RTT Specification.

The HLR 203 may comprise a database that stores information concerning mobile devices, such as mobile device 102, for which a subscription to the services of the network 107 has been established. The information may be stored for a given mobile device in the form of a record in the HLR 203 database. The record for a given mobile device may comprise one or more identifiers associated with the device. The one or more identifiers may comprise an international mobile subscriber identity (IMSI), a telephone number associated with the mobile device, and other information relating to the services of the network 107 available to the mobile device. The telephone number associated with the mobile device may comprise a mobile station international subscriber directory number (MSISDN), which telephone number may be assigned to the mobile device 102 by the operator of the CDMA network 107.

As further illustrated in FIG. 6, in this architecture, the packet switched network 110 may further comprise a voice call handling server (VHS) 209. The VHS 209 may comprise a network element in the packet switched network 110 configured handle calls based on the SIP protocol described in IETF RFC 3261 and to perform the telephony request mapping and modification functions described above in connection with FIG. 5. To that end, the VHS 209 may be configured to serve as an interface between the MSC 201 of the CDMA network 107 and the PGW 212 of the packet switched network 110. The VHS 209 of the packet switched network 110 and the MSC 201 of the CDMA network 107 may be communicatively connected via a SIP trunk formed between a Media Gateway Control Function/Session Border Controller (MGCF/SBC) 205 in the CDMA network 107 and a Session Border Controller (SBC) 211 in the packet switched network.

Figure 7A:
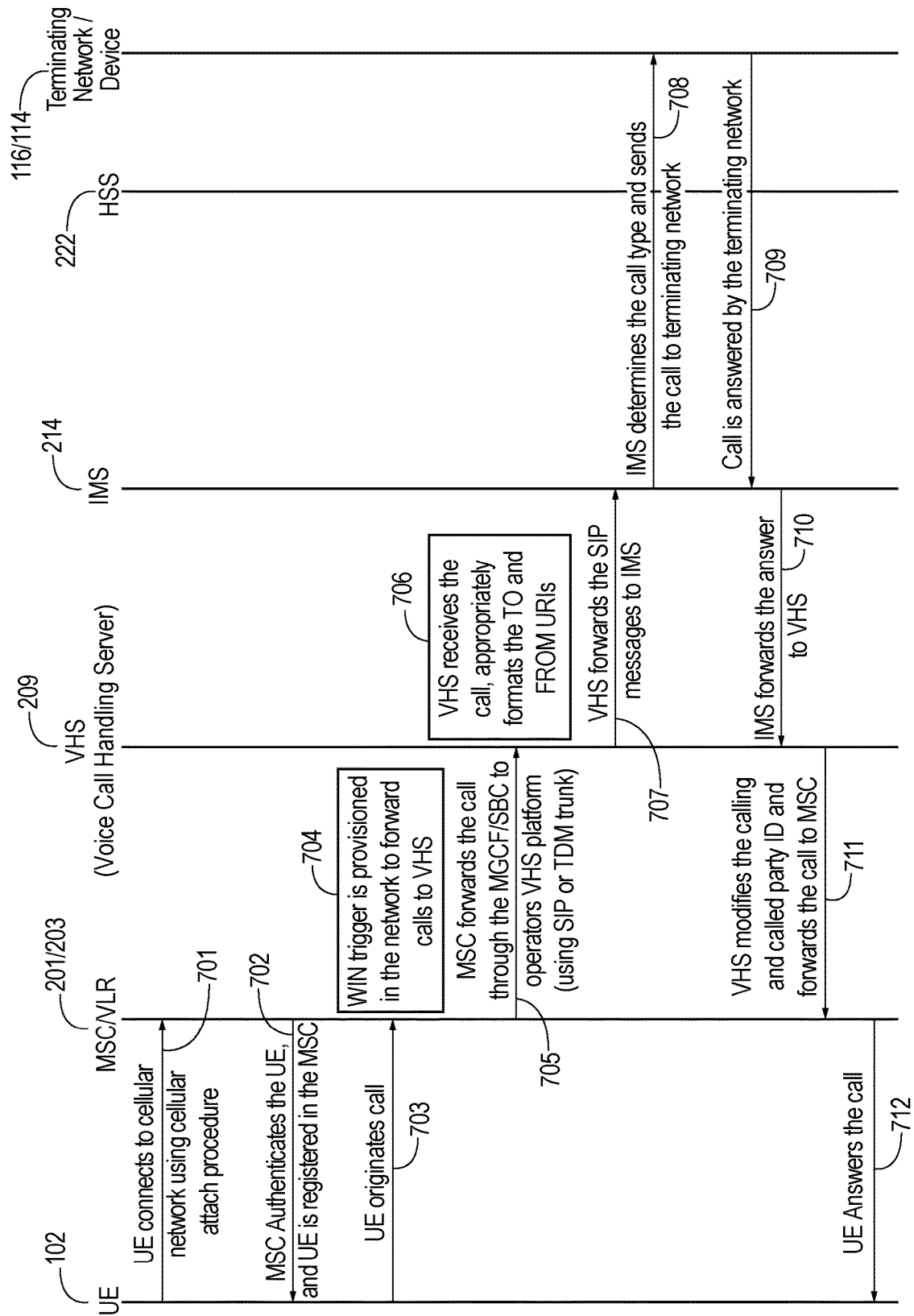
FIG. 7A is a call flow illustrating a method for conducting telephone communications in the system illustrated in FIGS. 5 and 6.

FIG. 7A is a call flow illustrating a method for conducting telephone communications using the additional cellular network 107 of FIGS. 5 and 6 in the event that a mobile device, such as the mobile device 102, is not able to connect directly to either the first cellular network (EPC/LTE) 106 or the packet switched network 110.

In step 701 of FIG. 7A, a mobile device, such as the mobile device 102, connects to the additional cellular network (CDMA) 107 via one of the base stations of the network, such as the NodeB/RNC 105, using a cellular attach procedure of the network 107. The cellular attach procedure may be performed in accordance with the 3GPP2 CDMA 2000 1×RTT Specification.

In step 702, the MSC 201, in cooperation with the HLR 203 authenticates the mobile device 102 and registers the mobile device 102 with the MSC 201. This authentication and registration process may be performed in accordance with the 3GPP2 CDMA 2000 1×RTT Specification.

In step 703, the mobile device 102 may initiate a telephone call to a destination communications device, such as the communications device 114. The telephone call may be initiated by a user of the mobile device 102 by dialing the telephone number of the destination communications device 114 using a dialer application (not shown) on the mobile device 102. The signaling for the call may be in the form of one or more Signaling System 7 (SS7) signaling messages.

At step 704, a Wireless Intelligent Network (WIN) trigger, which may be provisioned in the CDMA network 107, may intercept the call signaling, and at step 705, the MSC 201 may forward the call signaling to the VHS 209 of the packet switched network 209 using the SIP protocol. This SIP signaling (i.e., telephony request) may be forwarded to the VHS 209 using the SIP trunk formed between the MGCF/SBC 205 and SBC 211, which effectively connects the CDMA network 107 and the packet switched network 110. Alternatively, a time-division multiplexing (TDM) trunk may be employed.

At step 706, the VHS 209 may receive the call signaling. As mentioned above, the call signaling may comprise one or more SIP messages for call initiation. At least one of the SIP messages may identify a telephone number, such as an MSISDN, of the calling party—in this case the mobile device 102. However, because the call was initiated by the mobile device 102 using its connection to the CDMA network, the calling party telephone number in the received SIP messages will be the telephone number assigned to the mobile device by the operator of the CDMA network 107. In accordance with the method discussed above in connection with FIG. 5, the VHS 209 may be configured to determine that the telephone number of the calling mobile device 102 included in the SIP message—which is assigned by the operator of the CDMA network 107—maps to a telephone number (e.g., MSISDN) assigned to the mobile device 102 by the operator of the packet switched network 110. The VHS 209 may employ a mapping table stored by the VHS 209 to determine that the telephone number in the received SIP message maps to a telephone number assigned to the mobile device by the packet switched network operator. After determining the mapping, the VHS 209 is configured to modify the SIP message(s) by replacing the telephone number in the received messages with the mapped telephone number assigned by the operator of the packet switched network 110. In step 707, the VHS 209 sends the modified SIP messages to the IMS Core 214.

In step 708, the IMS Core 214 may determine the call type and destination, such as the communications device 114, and may forward the call signaling—in this case SIP message (s)—to the terminating network of the destination communications device 114 via the MGCF/MGW 224.

In step 709, the call may be answered by the communications device 114 of the terminating network 116 and a message indicating that the call has been answered may be received by the IMS Core 214. This answer message may also be in the form of a SIP message. The IMS Core 214 may forward the answer message to the VHS 209 in step 710. At this point, the answer message will identify the calling part by the modified telephone number assigned to the mobile device 102 by the operator of the packet switched network.

In step 711, the VHS 209 may reverse the mapping process to map the telephone number assigned by the packet switching network 110 back to the telephone number assigned to the mobile device 102 by the CDMA network 107. The VHS 209 may forward the modified answer message to the MSC 201 of the CDMA network 107. In step 712, the MSC 201 will transmit the answer message to the mobile device 102. The mobile device 102 may accept the answer message. The voice data for the call will be carried over a combination of a bearer channel of the CDMA network 107, the SIP trunk formed between the MGCF/SBC 205 and SBC 211, and an IP-based bearer channel in the packet-switched network 110. Even though the call may be initiated by the mobile device from the CDMA network 106, the call will appear as if originating from the telephone number (TN) assigned to the mobile device 102 by the operator of the packet switched network 110, not the telephone number associated with and assigned to the mobile device 102 by the operator of the CDMA network 107.

In step 703, the mobile device 102 may itself modify the telephony request by replacing the calling party telephone number assigned by the CDMA network 107 with the telephone number assigned by the packet switched network 110. For example, a modified dialer application on the mobile device (e.g., dialer application 954 of FIG. 9) may perform this replacement. In step 706, the VHS may employ out-of-band signaling with the mobile device 102 to obtain the corresponding telephone number associated with the CDMA network. The VHS 209 may use the CDMA network-related telephone number obtained via this out-of-band signaling in step 711 to switch the telephone number associated with the packet switching network 110 back to the telephone number associated with the CDMA network 107 in the received answer message, before forwarding the modified answer message to the MSC 201 of the CDMA network 107.

Figure 7B:
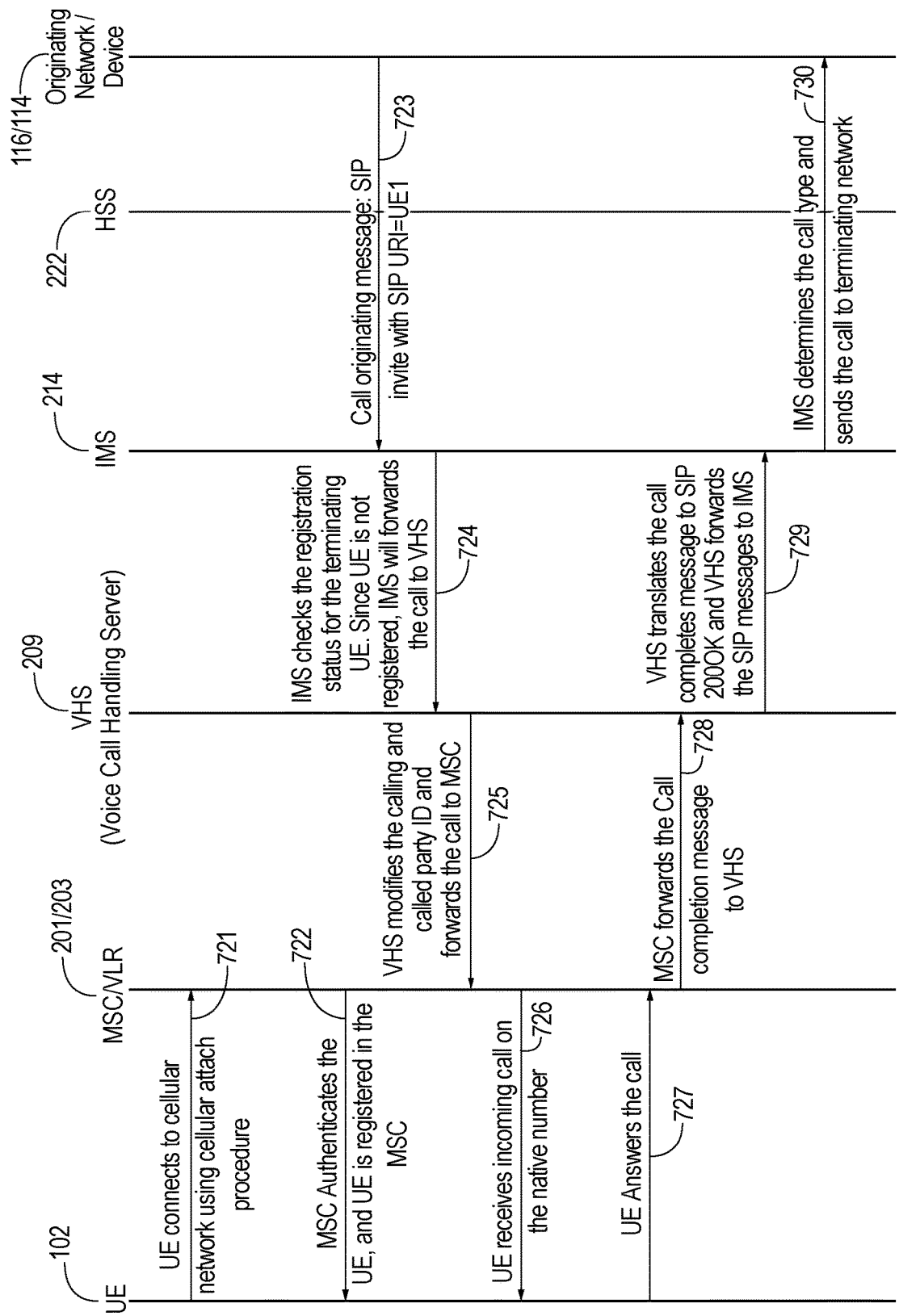
FIG. 7B is a call flow illustrating a method for conducting telephone communications in the system illustrated in FIGS. 5 and 6.

FIG. 7B is a call flow illustrating a method for conducting telephone communications using the additional cellular network 107 of FIGS. 5 and 6 in the event that a mobile device, such as the mobile device 102, is not able to connect directly to either the first cellular network (EPC/LTE) 106 or the packet switched network 110. In particular, the call flow of FIG. 7B shows the handling of a call originating from another communications device, such as the communications device 114, destined for the mobile device 102.

Steps 1 and 2 of FIG. 7B may be essentially the same as in the method of FIG. 7A. Specifically, in step 721 of FIG. 7B, a mobile device, such as the mobile device 102, connects to the additional cellular network (CDMA) 107 via one of the base stations of the network, such as the NodeB/RNC 105, using a cellular attach procedure of the network 107. The cellular attach procedure may be performed in accordance with the 3GPP2 CDMA 2000 1×RTT Specification.

In step 722, the MSC 201, in cooperation with the HLR 203, authenticates the mobile device 102 and registers the mobile device 102 with the MSC 201. This authentication and registration process may be performed in accordance with the 3GPP2 CDMA 2000 1×RTT Specification.

In step 723, a user of a communications device, such as the communications device 114, may originate a call to the mobile device 102 by dialing the telephone number (TN) assigned to the mobile device 102 by the operator of the packet switched network 110. As part of this call origination, the IMS Core 214 will receive a SIP Invite message from the originating network 116 via the MGCF/MGW 224. The SIP Invite message will identify the originator of the call (communications device 114) and the destination (mobile device 102). The mobile device 102 may be identified in the SIP Invite message by its telephone number (TN) assigned by the operator of the packet switched network 110.

In step 724, the IMS Core 214 may determine that the mobile device 102 has not registered with the IMS Core 214 or is not reachable via the packet switching network 110—neither via a wireless access point, such as the access point 108, nor via a cellular data connection through the EPC/LTE network 106. Upon determining that the mobile device 102 is not registered or is not reachable via the packet switched network 110, the IMS Core 214 may forward the call signaling to the VHS 209.

In step 725, the VHS 209 may be configured to determine that the destination telephone number (TN) of the mobile device 102 contained in the SIP message maps to a second telephone number assigned to the mobile device by the operator of the CDMA network 107. The VHS 209 may modify the SIP message by replacing the telephone number assigned to the mobile device 102 by the packet switching network with the telephone number assigned by the CDMA network 107. The VHS 209 may forward the SIP message to the MSC 201 of the CDMA network 107 via the SIP trunk (or alternatively a TDM trunk) established between the SBC 211 of the packet switched network 110 and the MGCF/SBC 205 of the CDMA network 107.

In step 726, the MSC 201 may forward the call signaling to the mobile device 102 via one of its base stations, such as base station 105, using protocols of the CDMA network 107.

In step 727, the mobile device 102 may send a call completion message back to the MSC indicating that the call has been answered by the mobile device 102. This call completion message may identify the mobile device 102 by the telephone number (TN) assigned to the mobile device 102 by the CDMA network 107.

In step 728, the MSC 201 may forward the call completion message to the VHS 209 of the packet switched network via the SIP trunk between the MGCF/SBC 205 and SBC 211.

In step 729, the VHS 209 may receive the call completion message and may reverse the mapping process to map the telephone number assigned by the CDMA network 107 in the call completion message back to the telephone number assigned to the mobile device 102 by the operator of the packet switched network 110. The VHS 209 may translate the call completion message to a SIP answer message in accordance with the SIP protocol and modify the response to include, as the identifier of the answering party, the telephone number of the mobile device 102 assigned by the packet switched network 110. The VHS 209 may forward the modified SIP answer message to the IMS Core 214.

In step 730, the IMS Core 214 may determine the call type and send the SIP answer message to the originating network 116 via the MGCF/MGW 224 and on to the originating communications device 114. The voice data for the call may be carried over a combination of a bearer channel of the CDMA network 107, the SIP trunk formed between the MGCF/SBC 205 and SBC 211, and an IP-based bearer channel in the packet-switched network 110.

Thus, again, even in the event that the mobile device 102 does not have connectivity to either the packet switched network 110 or the EPC/LTE network 106, the mobile device 102 may still be able to originate and receive calls via the additional cellular network 107. Moreover, those calls may still appear to the respective endpoints as if originating from or destined for the telephone number assigned to the mobile device 102 by the operator of the packet switched network.

The system of FIGS. 5 and 6 may be configured to provide functionality for handling emergency calls, such as calls initiated by a user dialing 9-1-1 using the dialer application on the mobile device 102, in the event that the mobile device 102 is not able to connect directly to either the first cellular network (EPC/LTE) 106 or the packet switched network 110. For example, 9-1-1 calls dialed on the mobile device 102, if not connected to the first cellular network (EPC/LTE) 106 or the packet switched network 110, may originate using the TN assigned by the network provider of the additional cellular network 107 and the location information may be maintained and provided by that network provider.

It is understood that the network elements and devices illustrated in FIGS. 1-7B may represent logical entities in the respective communications networks and may be implemented in the form of software (i.e., computer-executable instructions) stored in a memory of, and executing on a processor of, computing device, which may comprise one of the architectures illustrated in FIG. 8 or 9 described below. Thus, the methods illustrated in FIGS. 3,4, 7A and 7B may be implemented in the form of software (i.e., computer-executable instructions) stored in a memory of such network elements and devices, which when executed by a processor of the network element or device, perform the steps illustrated in the figures. It is also understood that any transmitting and receiving steps illustrated in these figures may be performed by communication circuitry (e.g., network interface controller 822 of FIG. 8, transceivers 934a,b of FIG. 9) of the network element or device under control of its processor the computer-executable instructions that it executes.

Figure 8:
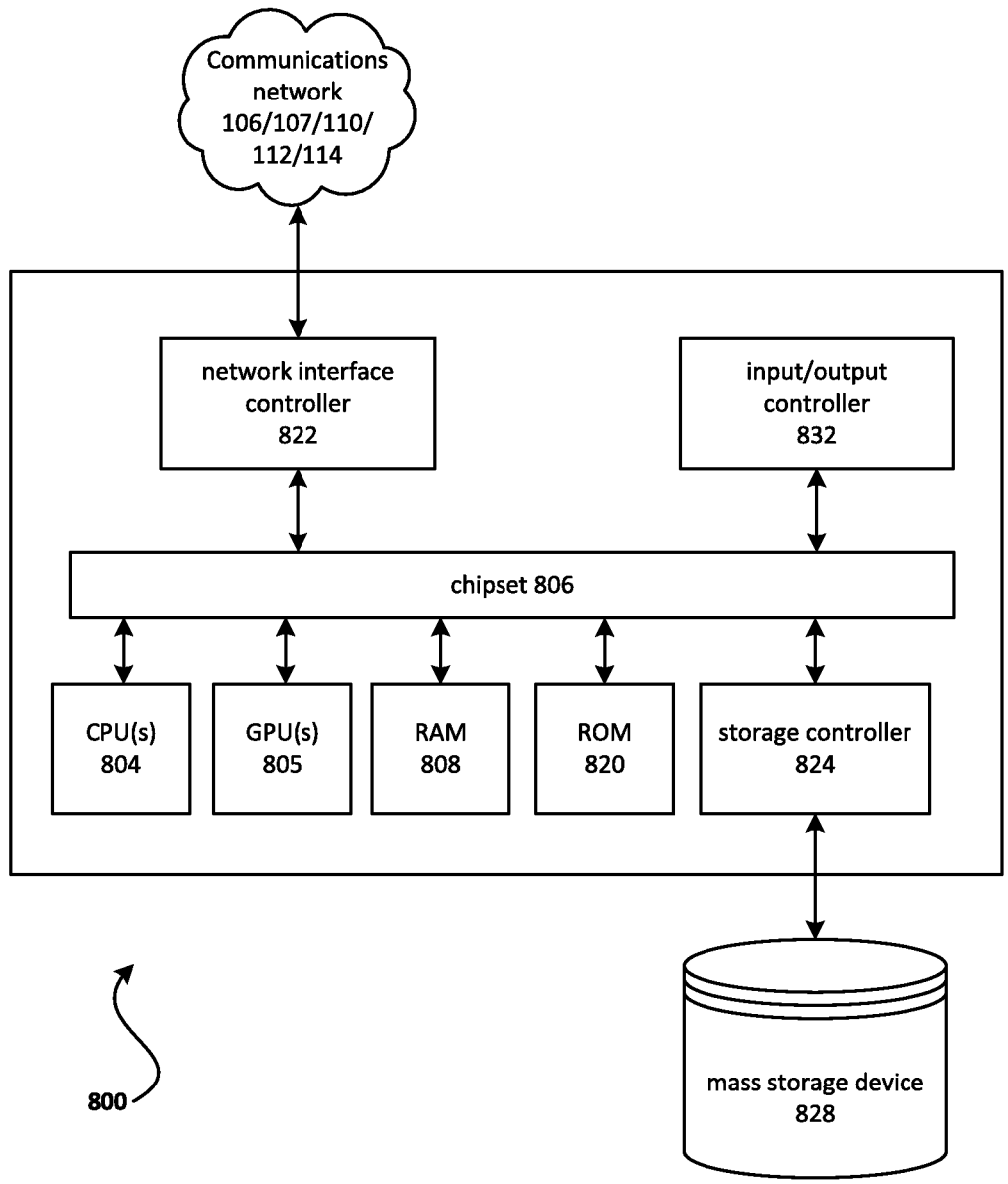
FIG. 8 a block diagram of an example computing device.

FIG. 8 depicts a computing device 800 that may represent any of the various network elements illustrated in FIGS. 1, 2, 5, and 6, including, for example, the eNodeB 104, AP 108, MME 202, HSS 204, SGW 206, PGW 208, ePDG 210, PGW 212, IMS Core 214, P-CSCF 216, PCRF 218, AAA 220, IMS HSS 222, MGCF/MGW 224, communications device 114, RNC/NodeB 105, MSC 201, HLR 203, MGCF/SBC 205, SBC 2011, or any other device or network element described herein. The architecture of the computing device 800 may be utilized to execute any aspects of the functionality described herein, such as to implement any of the aforementioned network elements or any of the methods described in relation to FIGS. 3, 4, 7A and 7B.

The computing device 800 may include a baseboard, or "motherboard," which may be a printed circuit board to which a multitude of components or devices may be connected by way of a system bus or other electrical communication paths. One or more central processing units (CPUs or "processors") 804 may operate in conjunction with a chipset 806. The CPU(s) 804 may be standard programmable processors that perform arithmetic and logical operations necessary for the operation of the computing device 800.

The CPU(s) 804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 804 may be augmented with or replaced by other processing units, such as GPU(s) 805. The GPU(s) 805 may comprise processing units specialized for but not necessarily limited to highly parallel computations, such as graphics and other visualization-related processing.

A chipset 806 may provide an interface between the CPU(s) 804 and the remainder of the components and devices on the baseboard. The chipset 806 may provide an interface to a random access memory (RAM) 808 used as the main memory in the computing device 800. The chipset 806 may provide an interface to a computer-readable storage medium, such as a read-only memory (ROM) 820 or non-volatile RAM (NVRAM) (not shown), for storing basic routines that may help to start up the computing device 800 and to transfer information between the various components and devices. ROM 820 or NVRAM may also store other software components necessary for the operation of the computing device 800 in accordance with the aspects described herein.

The computing device 800 may operate in a networked environment using logical connections to network elements or devices of any network to which the computing device is connected, such as the networks 106, 107, 110, 112, and 116 depicted in FIGS. 1, 2, 5, and 6. The chipset 806 may include functionality for providing such network connectivity through a network interface controller (NIC) 822, such as a gigabit Ethernet adapter of any other suitable network adapter. It should be appreciated that multiple NICs 822 may be present in the computing device 800, connecting the computing device to other types of networks and remote computer systems. The NIC may also comprise any suitable wireless network interface controller capable of wirelessly connecting and communicating with other devices or network elements on such networks. For example, the NIC 822 may operate in accordance with any of a variety of wireless communication protocols, including for example, the IEEE 802.11 ("Wi-Fi") protocol, the IEEE 802.16 or 802.20 ("WiMAX") protocols, the IEEE 802.15.4a ("Zigbee") protocol, the 802.15.3c ("UWB") protocol, or the like.

The computing device 800 may be connected to a mass storage device 828 that provides non-volatile storage (i.e., memory) for the computer. The mass storage device 828 may store system programs, application programs, other program modules, and data, which have been described in greater detail herein. The mass storage device 828 may be connected to the computing device 800 through a storage controller 824 connected to the chipset 806. The mass storage device 828 may consist of one or more physical storage units. A storage controller 824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 800 may store data on a mass storage device 828 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 828 is characterized as primary or secondary storage and the like.

The computing device 800 may store information to the mass storage device 828 by issuing instructions through a storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 may read information from the mass storage device 828 by detecting the physical states or characteristics of one or more particular locations within the physical storage units.

The computing device 800 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 800.

By way of example and not limitation, computer-readable storage media may include volatile and non-volatile, non-transitory computer-readable storage media, and removable and non-removable media implemented in any method or technology. However, as used herein, the term computer-readable storage media does not encompass transitory computer-readable storage media, such as signals. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other non-transitory medium that may be used to store the desired information in a non-transitory fashion.

A mass storage device, such as the mass storage device 828 depicted in FIG. 8, may store an operating system utilized to control the operation of the computing device 800. The operating system may comprise a version of the LINUX operating system. The operating system may comprise a version of the WINDOWS SERVER operating system from the MICROSOFT Corporation. The operating system may comprise a version of the UNIX operating system. Various mobile phone operating systems, such as IOS and ANDROID, may also be utilized. It should be appreciated that other operating systems may also be utilized. The mass storage device 828 may store other system or application programs and data utilized by the computing device 800.

The mass storage device 828 or other computer-readable storage media may also be encoded with computer-executable instructions, which, when loaded into the computing device 800, transforms the computing device from a general-purpose computing system into a special-purpose computer capable of implementing the aspects described herein. These computer-executable instructions transform the computing device 800 by specifying how the CPU(s) 804 transition between states, as described herein. The computing device 800 may have access to computer-readable storage media storing computer-executable instructions, which, when executed by the computing device 800, may perform the methods described in relation to FIGS. 3, 4, 7A and 7B.

A computing device, such as the computing device 800 depicted in FIG. 8, may also include an input/output controller 832 for receiving and processing input from a number of input devices, such as a keyboard, a mouse, a touchpad, a touch screen, an electronic stylus, or other type of input device. Similarly, an input/output controller 832 may provide output to a display, such as a computer monitor, a flat-panel display, a digital projector, a printer, a plotter, or other type of output device. It will be appreciated that the computing device 800 may not include all of the components shown in FIG. 8, may include other components that are not explicitly shown in FIG. 8, or may utilize an architecture completely different than that shown in FIG. 8.

As described herein, a computing device may be a physical computing device, such as the computing device 800 of FIG. 8. A computing device may also include a virtual machine host process and one or more virtual machine instances. Computer-executable instructions may be executed by the physical hardware of a computing device indirectly through interpretation and/or execution of instructions stored and executed in the context of a virtual machine.

Figure 9:
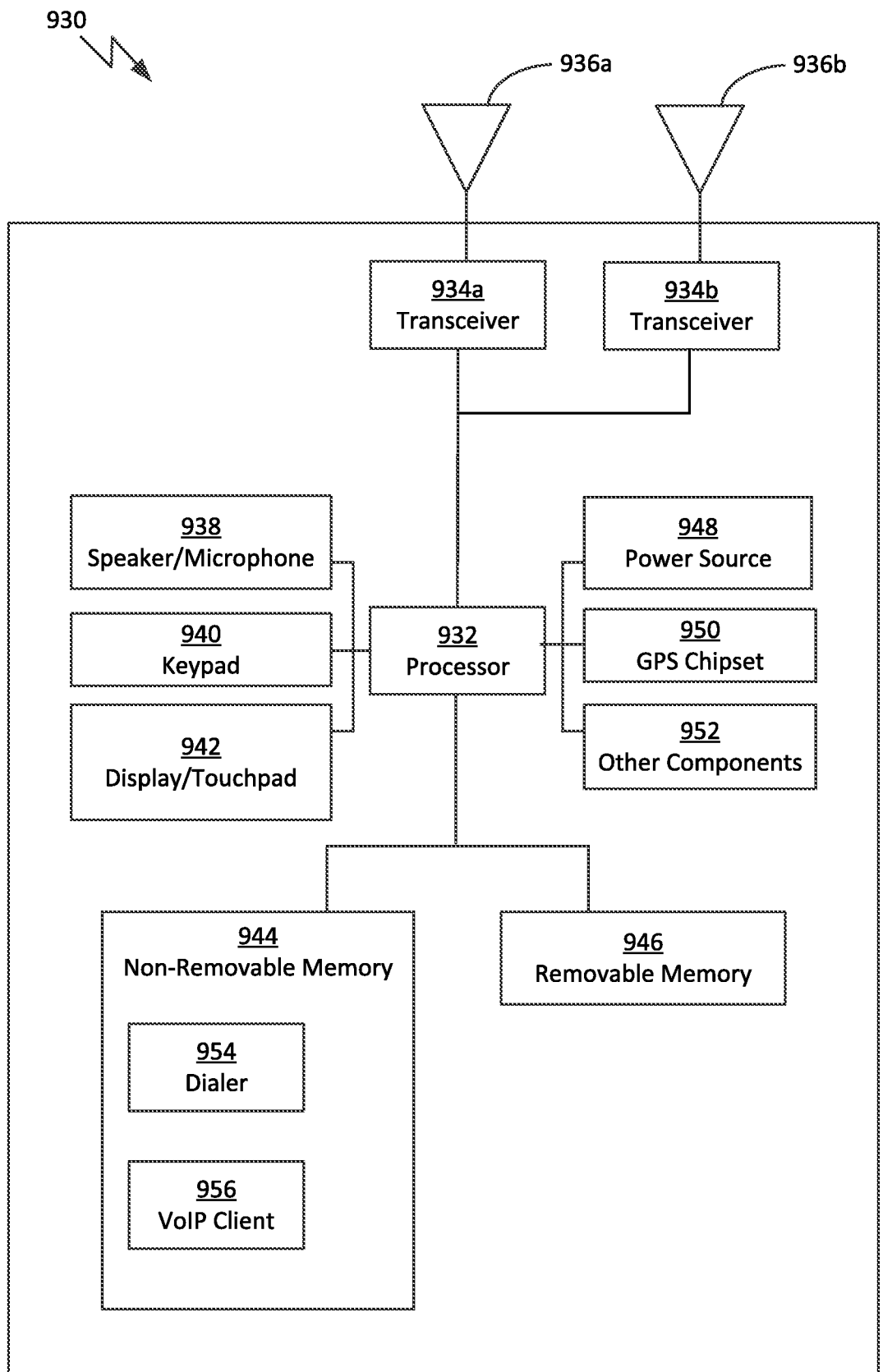
FIG. 9 is a block diagram of an example mobile device.

FIG. 9 is a block diagram illustrating an architecture of a mobile device 930, such as may be representative of the mobile device 102 of FIGS. 1-7B. The mobile device 930 may comprise any of a variety of different types of mobile devices, including for example, a smartphone, a tablet computer, a laptop computer, a notebook computer, a personal computer, a personal digital assistant (PDA), a user equipment (UE), a mobile station, a fixed or mobile subscriber unit, a pager, a wireless sensor, other consumer electronics, and the like.

In FIG. 9, the mobile device 930 may include a processor 932, non-removable memory 944, removable memory 946, a speaker/microphone 938, a keypad 940, a display or touchpad 942, a power source 948, a global positioning system (GPS) chipset 950, and other components 952. The mobile device 930 may also include communication circuitry, such as one or more transceivers 934a, 934b and one or more antennas 936a, 936b.

The processor 932 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 392 may execute computer-executable instructions stored in the memory (e.g., memory 44 and/or memory 46) of the device in order to perform the various required functions of the device. For example, the processor 932 may perform signal coding, data processing, power control, input/output processing, and/or any other functionality that enables the mobile device 930 to operate in a wireless or wired environment. The processor 932 may run application programs, operating systems, communications programs, or other programs. The processor 932 may run a dialer application 954 to enable users to initiate and answer telephone calls or VoIP communications. The processor 932 may also run a VoIP Client to perform VoIP communications. These applications, programs, and clients may reside in and be retrieved for execution from a memory of the mobile device 930, such as the memory 944. The processor 932 may also perform security operations such as authentication, security key agreement, and cryptographic operations.

In FIG. 9, the processor 932 may be coupled to its communication circuitry (e.g., transceivers 934a, 934b and antennas 936a, 936b). The processor 932, through the execution of computer executable instructions, may control the communication circuitry in order to cause the mobile device 930 to communicate with other elements of a network to which it is connected. In particular, the processor 932 may control the communication circuitry in order to perform the methods described in relation to FIGS. 3, 4, 7A and 7B, or as recited in a claim. While FIG. 9 depicts the processor 932 and the transceivers 934a, 934b as separate components, it will be appreciated that the processor 932 and the transceivers 934a, 934b may be integrated together in an electronic package or chip.

The antennas 936a, 936b may be configured to transmit signals to, or receive signals from, other network elements, including base stations and access points, such as the base stations 104, 105, and 108 of FIGS. 1, 2, 5, and 6. The transceivers 934a, 934b and antennas 936a, 936b may support various networks and air interfaces, such as Wi-Fi, WLAN, WPAN, cellular, and the like. Although the antennas 936a, 936b are depicted in FIG. 9 as single elements, the mobile device 930 may include any number of antennas. For example, the mobile device 930 may employ MIMO technology. Thus, each of the illustrated antennas 936a, 936b may comprise multiple antennas for transmitting and receiving wireless signals.

Each transceiver 934a, 934b may be configured to modulate the signals that are to be transmitted by the antennas 936a, 936b and to demodulate the signals that are received by the antennas. Each transceiver 934a, 934b and its respective antenna 936a, 936b may implement a different radio access technology. For example, one of the transceivers may implement a cellular radio access technology, such as CDMA or LTE, while another of the transceivers may implement the IEEE 802.11 (Wi-Fi) radio access technology. Moreover, although the mobile device 930 is depicted as including two transceivers 934a, 934b and respective antennas 936a, 936b, it is understood that the mobile device 930 may comprise more or less transceivers and antennas. With reference to FIGS. 1, 2, 5, and 6, the mobile device 930 may comprise one transceiver/antenna for communicating with the EPC/LTE network 106 via the base station 104, another transceiver/antenna for communicating with the packet switched network 110 via wireless access point 108, and yet another transceiver/antenna for communicating with the CDM network 107 via the base station 105.

The processor 932 may access information from, and store data in, any type of suitable memory, such as the non-removable memory 944 and/or the removable memory 496. For example, the processor 932 may store session context in its memory, as described above. The non-removable memory 944 may include random-access memory (RAM), read-only memory (ROM), a hard disk, or any other type of memory storage device. The removable memory 946 may include a subscriber identity module (SIM) card, a memory stick, a secure digital (SD) memory card, and the like. The processor 932 may access information from, and store data in, memory that is not physically located on the mobile device 930, such as on a server or a computer.

The processor 932 may receive power from the power source 948, and may be configured to distribute and/or control the power to the other components in the mobile device 930. The power source 948 may be any suitable device for powering the mobile device 930. For example, the power source 948 may include one or more dry cell batteries (e.g., nickel-cadmium (NiCad), nickel-zinc (NiZn), nickel metal hydride (NiMH), lithium-ion (Li-ion), etc.), solar cells, fuel cells, and the like.

The processor 932 may also be coupled to the GPS chipset 950, which is configured to provide location information (e.g., longitude and latitude) regarding the current location of the mobile device 930. It will be appreciated that the mobile device 930 may acquire location information by way of any suitable location-determination method.

The processor 932 may further be coupled to other components 952, which may include one or more software or hardware modules that provide additional features or functionality. For example, the peripherals 952 may include various sensors, a camera, or the like.

The methods and systems described herein are not limited to specific methods, specific components, or to particular implementations. It is also to be understood that the terminology used herein is for the purpose of description only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, it may include from the one particular value and/or to the other particular value. The endpoints of each of the ranges may be significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preference or ideal. "Such as" is not used in a restrictive sense, but for explanatory purposes.

Components and devices are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed, each of these additional operations may be performed with any others.

As will be appreciated by one skilled in the art, the methods and systems may implemented in the form of hardware, software, or a combination of software and hardware. Furthermore, the methods and systems may take the form of a computer program product on a computer-readable storage medium having computer-readable instructions (e.g., computer software or program code) stored on the storage medium. More particularly, the present methods and systems may take the form of web-implemented computer software. Any suitable computer-readable storage medium may be utilized including hard disks, CD-ROMs, optical storage devices, or magnetic storage devices.

The methods and systems are described above with reference to block diagrams and flowchart illustrations of methods, systems, apparatuses and computer program products. Each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. Certain methods or process blocks may be omitted. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed. The systems and components described herein may be configured differently than described. For example, elements may be added to, removed from, or rearranged.

It will also be appreciated that various items are illustrated as being stored in memory or on storage while being used, and that these items or portions thereof may be transferred between memory and other storage devices for purposes of memory management and data integrity. Some or all of the software modules and/or systems may execute in memory on another device and communicate with the illustrated computing systems via inter-computer communication. Some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms.

Although methods and systems have been described herein and shown in the figures, it is not intended that the scope of the appended claims be limited thereto.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of methods described in the specification.

It will be apparent to those skilled in the art that various modifications and variations may be made without departing from the scope or spirit of the present disclosure. It is intended that the specification and figures be considered as exemplary only, with a true scope and spirit being indicated by the following claims.

What is claimed:

1. A method comprising:
communicating, by a device, with a cellular network operated by a first network operator;
sending, by the device to a packet switched network operated by a second network operator, via a cellular data connection of the cellular network, a request to register for telephony services of the packet switched network;
based on a wireless connection to a wireless access point of the packet switched network being available, sending, by the device to the packet switched network, via the wireless access point, a request to initiate voice-over-internet-packet (VoIP) communications via the wireless access point and the packet switched network; and
based on a wireless connection to a wireless access point of the packet switched network not being available, sending, by the device to the packet switched network, via the cellular data connection of the cellular network, the request to initiate voice-over-internet-packet (VoIP) communications via the cellular data connection and the packet switched network.

2. The method recited in claim 1, wherein the packet switched network comprises an Internet Protocol (IP) multimedia core network subsystem.

3. The method recited in claim 1, wherein the wireless access point of the packet switched network operates in accordance with the IEEE 802.11 (Wi-Fi) radio access technology, and wherein the device establishes a Wi-Fi connection to the packet switched network via the wireless access point.

4. The method recited in claim 1, wherein the cellular network comprises an evolved packet core (EPC) network that implements the Long-Term Evolution (LTE) radio access technology.

5. The method recited in claim 1, wherein the device communicates with the cellular network via a base station of the cellular network.

6. The method recited in claim 1, wherein the device communicates with the cellular network based on first credentials comprising a first telephone number associated with the cellular network and provisioned by the first network operator, and wherein the device communicates with the packet switched network based on second credentials comprising a second telephone number associated with the packet switched network and provisioned by the second network operator.

7. A system comprising:
a cellular network operated by a first network operator, wherein the cellular network comprises a base station configured to provide access to the cellular network;
a packet switched network operated by a second network operator, wherein the packet switched network comprises a wireless access point configured to provide access to the packet switched network; and
a mobile device, wherein the mobile device is configured to:
communicate with the cellular network via the base station;
send, to the packet switched network, via a cellular data connection of the cellular network, a request to register for telephony services of the packet switched network;
based on a wireless connection to the wireless access point of the packet switched network being available, send, to the packet switched network, via the wireless access point, a request to initiate voice-over-internet-packet (VoIP) communications via the wireless access point and the packet switched network; and
based on a wireless connection to the wireless access point of the packet switched network not being available, send, to the packet switched network, via the cellular data connection of the cellular network, the request to initiate voice-over-internet-packet (VoIP) communications via the cellular data connection and the packet switched network.

8. The system recited in claim 7, wherein the packet switched network comprises an Internet Protocol (IP) multimedia core network subsystem.

9. The system recited in claim 7, wherein the wireless access point of the packet switched network operates in accordance with the IEEE 802.11 (Wi-Fi) radio access technology, and wherein the mobile device establishes a Wi-Fi connection to the packet switched network via the wireless access point.

10. The system recited in claim 7, wherein the cellular network comprises an evolved packet core (EPC) network that implements the Long-Term Evolution (LTE) radio access technology.

11. The system recited in claim 7, wherein the mobile device communicates with the cellular network based on first credentials comprising a first telephone number associated with the cellular network and provisioned by the first network operator, and wherein the device communicates with the packet switched network based on second credentials comprising a second telephone number associated with the packet switched network and provisioned by the second network operator.

12. The system recited in claim 11, wherein VoIP communications initiated by the mobile device either via the cellular data connection and the packet switched network or via the wireless access point and the packet switched network appear to a destination of the VoIP communication as originating from the second telephone number associated with the packet switched network.

13. A method comprising:
receiving, from a component of a cellular network operated by a first network operator, by a packet switched network operated by a second network operator, a telephony request comprising a first identifier associated with a device that initiated the telephony request via the cellular network, wherein the first identifier identifies the device to the first network operator;
determining, by the packet switched network operated by the second network operator, that the first identifier maps to a second identifier that identifies the device to the second network operator;
modifying, by the packet switched network, the telephony request by replacing the first identifier with the second identifier in the request; and
forwarding, by the packet switched network, the modified telephony request toward a destination of the telephony request.

14. The method recited in claim 13, wherein the packet switched network comprises an Internet Protocol (IP) multimedia core network subsystem.

15. The method recited in claim 13, wherein the cellular network comprises an evolved packet core (EPC) network that implements the Long-Term Evolution (LTE) radio access technology.

16. The method recited in claim 13, wherein the first identifier comprises a first telephone number provisioned for the device by the first network operator, and wherein the second identifier comprises a second telephone number provisioned for the device by the second network operator.

17. The method recited in claim 13, wherein the telephony request is received by the packet switched network from the cellular network using a session initiation protocol (SIP) trunk connecting the packet switched network and the cellular network.

18. The method recited in claim 13, further comprising:
receiving, by the packet switched network operated by the second network operator, another telephony request intended for the device, the another telephony request comprising the second identifier that identifies the device to the second network operator of the packet switched network;
determining, by the packet switched network, that the device is not reachable via a wireless access point of the packet switched network;
determining, by the packet switched network, that the second identifier maps to the first identifier that identifies the device to the first network operator of the cellular network;
modifying the telephony request by replacing the second identifier with the first identifier in the request; and
forwarding, by the packet switched network to the cellular network, the modified telephony request.

* * * * *